United States Patent
Larocca et al.

(10) Patent No.: US 10,586,317 B2
(45) Date of Patent: Mar. 10, 2020

(54) DIGITAL USER INTERFACE TO PROVIDE DRAWING DIRECTIONS TO GUIDE USER

(71) Applicant: DreamWorks Animation LLC, Glendale, CA (US)

(72) Inventors: Scott Larocca, Altadena, CA (US); Campbell McGrouther, Glendale, CA (US)

(73) Assignee: DreamWorks Animation L.L.C., Universal City, CA (US)

( * ) Notice: Subject to any disclaimer, the term of this patent is extended or adjusted under 35 U.S.C. 154(b) by 423 days.

(21) Appl. No.: 15/358,028

(22) Filed: Nov. 21, 2016

(65) Prior Publication Data
US 2017/0169555 A1    Jun. 15, 2017

Related U.S. Application Data

(60) Provisional application No. 62/265,375, filed on Dec. 9, 2015.

(51) Int. Cl.
| | |
|---|---|
| *G06T 7/00* | (2017.01) |
| *G06F 3/0481* | (2013.01) |
| *G06F 3/0482* | (2013.01) |
| *G06F 3/0488* | (2013.01) |
| *G06K 9/00* | (2006.01) |
| *G06T 11/20* | (2006.01) |

(52) U.S. Cl.
CPC .......... *G06T 7/0002* (2013.01); *G06F 3/0482* (2013.01); *G06F 3/04817* (2013.01); *G06F 3/04883* (2013.01); *G06K 9/00671* (2013.01); *G06T 11/203* (2013.01)

(58) Field of Classification Search
CPC ...................................................... G09B 7/04
See application file for complete search history.

(56) References Cited

U.S. PATENT DOCUMENTS

| | | | |
|---|---|---|---|
| 5,513,991 A * | 5/1996 | Reynolds ................. | G09B 7/04 348/61 |
| 2010/0039434 A1* | 2/2010 | Makkinejad ............ | G06T 13/80 345/473 |

(Continued)

OTHER PUBLICATIONS

Extended European Search Report (includes Supplementary European Search Report and Search Opinion) received for European Patent Application No. 16202331.1, dated May 3, 2017, 9 pages.

(Continued)

*Primary Examiner* — Cao H Nguyen
(74) *Attorney, Agent, or Firm* — Dentons US LLP

(57) ABSTRACT

An electronic device with a display screen provides drawing directions to guide a user to create artwork on a physical medium. The electronic device displays a first drawing direction for drawing a portion of a subject on a physical medium, and prompts a user for a user input indicating completion of the first drawing direction by the user. Upon receiving the prompted user input, the electronic device displays a second drawing direction for drawing another portion of the subject on the physical medium. The subject may be based on a computer-animated movie title. The first drawing direction may include a representation of a virtual host, which is also based on a computer-animated character from a computer-animated movie title.

57 Claims, 29 Drawing Sheets

(56) References Cited

U.S. PATENT DOCUMENTS

2013/0100159 A1    4/2013    Fernquist et al.
2014/0111700 A1    4/2014    Paxinos et al.

OTHER PUBLICATIONS

Office Action received for European Patent Application No. 16202331.1, dated May 3, 2018, 9 pages.
Summons to Attend Oral Proceedings received for European Patent Application No. 16202331.1, dated May 31, 2019, 12 pages.

* cited by examiner

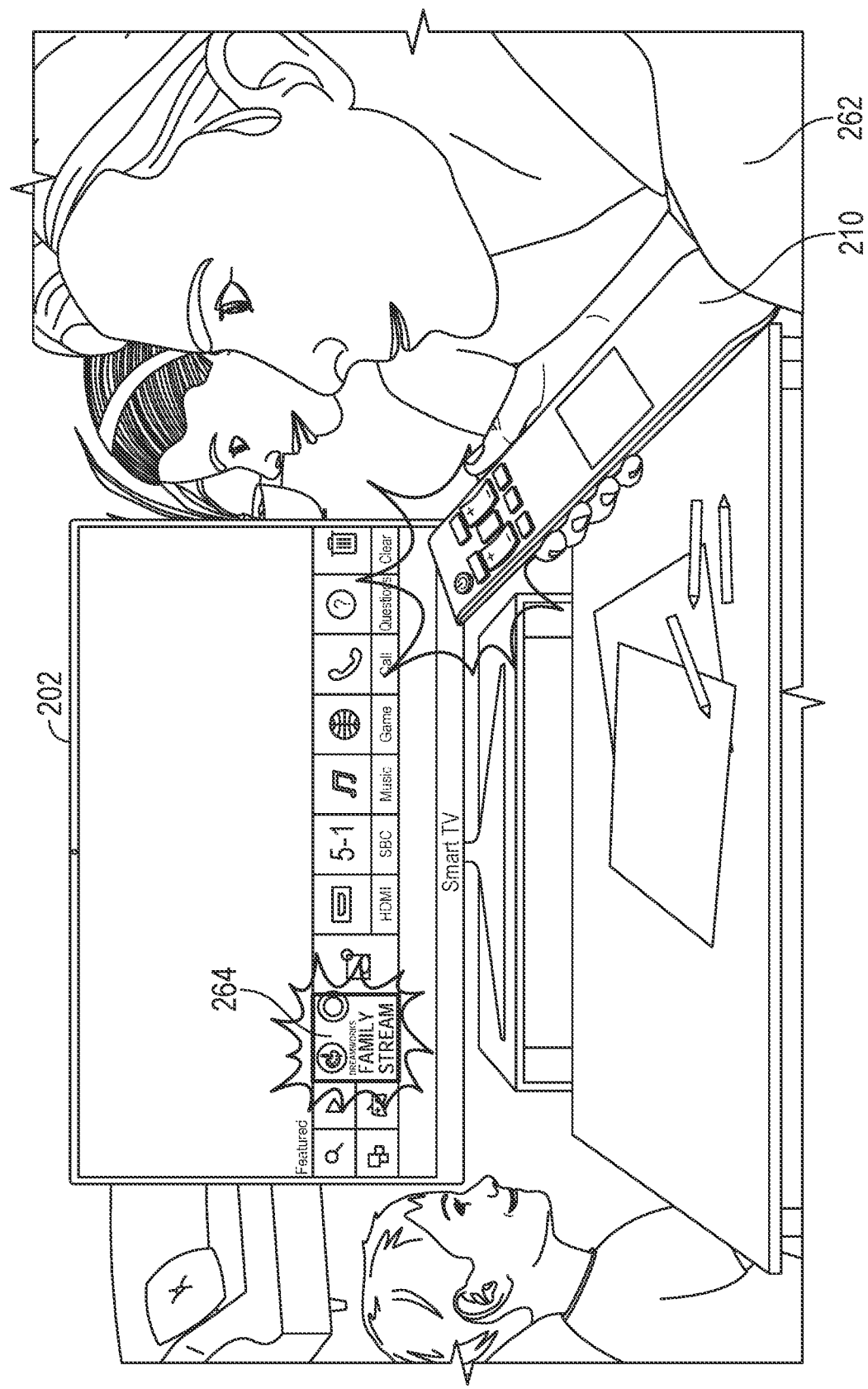

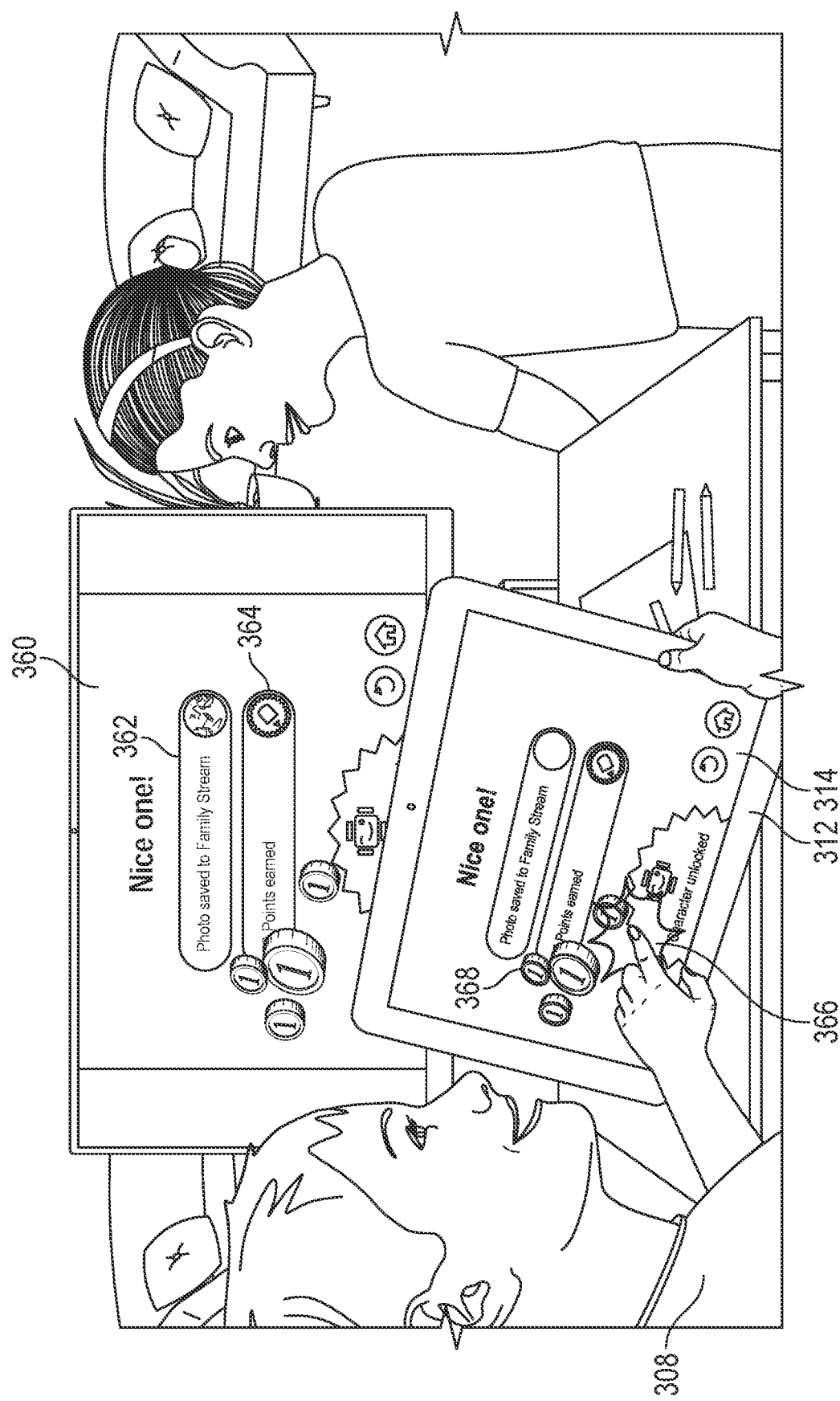

DIGITAL USER INTERFACE TO PROVIDE DRAWING DIRECTIONS TO GUIDE USER

CROSS-REFERENCE TO RELATED APPLICATIONS

This application claims priority to U.S. Provisional Patent Application No. 62/265,375, entitled "DIGITAL USER INTERFACE TO PROVIDE DRAWING DIRECTIONS TO GUIDE USER", filed on Dec. 9, 2015, the content of which is hereby incorporated by reference in its entirety for all purposes.

BACKGROUND

The present disclosure relates to a digital user interface that provides drawing directions to guide a user to create artwork on a physical medium.

BRIEF SUMMARY

In some embodiments, a computer-implemented method for providing drawing directions comprises: displaying, on a display screen of an electronic device, a first drawing direction of a set of drawing directions, wherein the set of drawing directions provide directions for drawing a subject of a computer-animated movie title on a physical medium, wherein the first drawing direction includes a representation of a virtual host, wherein the virtual host is a computer-animated character from a computer-animated movie title, and wherein the virtual host provides at least a part of the directions for drawing the subject; prompting for a user input representing completion of the first drawing direction by a user on the physical medium; and, in response to receiving the user input representing completion of the first drawing direction, displaying, on the display screen, a second drawing direction of the set of drawing directions.

In some embodiments, a non-transitory computer-readable storage medium stores one or more programs, the one or more programs comprising instructions, which, when executed by one or more processors of an electronic device with a display screen, cause the device to: display, on the display screen, a first drawing direction of a set of drawing directions, wherein the set of drawing directions provide directions for drawing a subject of a computer-animated movie title on a physical medium, wherein the first drawing direction includes a representation of a virtual host, wherein the virtual host is a computer-animated character from a computer-animated movie title, and wherein the virtual host provides at least a part of the directions for drawing the subject; prompt for a user input representing completion of the first drawing direction by a user on the physical medium; and, in response to receiving the user input representing completion of the first drawing direction, display, on the display screen, a second drawing direction of the set of drawing directions.

In some embodiments, an electronic device comprises a display screen, one or more processors, memory, and one or more programs, wherein the one or more programs are stored in the memory and configured to be executed by the one or more processors, the one or more programs including instructions for: displaying, on the display screen, a first drawing direction of a set of drawing directions, wherein the set of drawing directions provide directions for drawing a subject of a computer-animated movie title on a physical medium, wherein the first drawing direction includes a representation of a virtual host, wherein the virtual host is a computer-animated character from a computer-animated movie title, and wherein the virtual host provides at least a part of the directions for drawing the subject; prompting for a user input representing completion of the first drawing direction by a user on the physical medium; and, in response to receiving the user input representing completion of the first drawing direction, displaying, on the display screen, a second drawing direction of the set of drawing directions.

DESCRIPTION OF THE FIGURES

FIGS. 2A-2K depict exemplary user interfaces provided by embodiments of the drawing direction interface.

DETAILED DESCRIPTION

The following description sets forth exemplary methods, parameters, and the like. It should be recognized, however, that such description is not intended as a limitation on the scope of the present disclosure but is instead provided as a description of exemplary embodiments. The described exemplary embodiments include a digital user interface that provides drawing directions to guide the user to create artwork on a physical medium. In some embodiments, the digital user interface is a software application.

Figure 1:
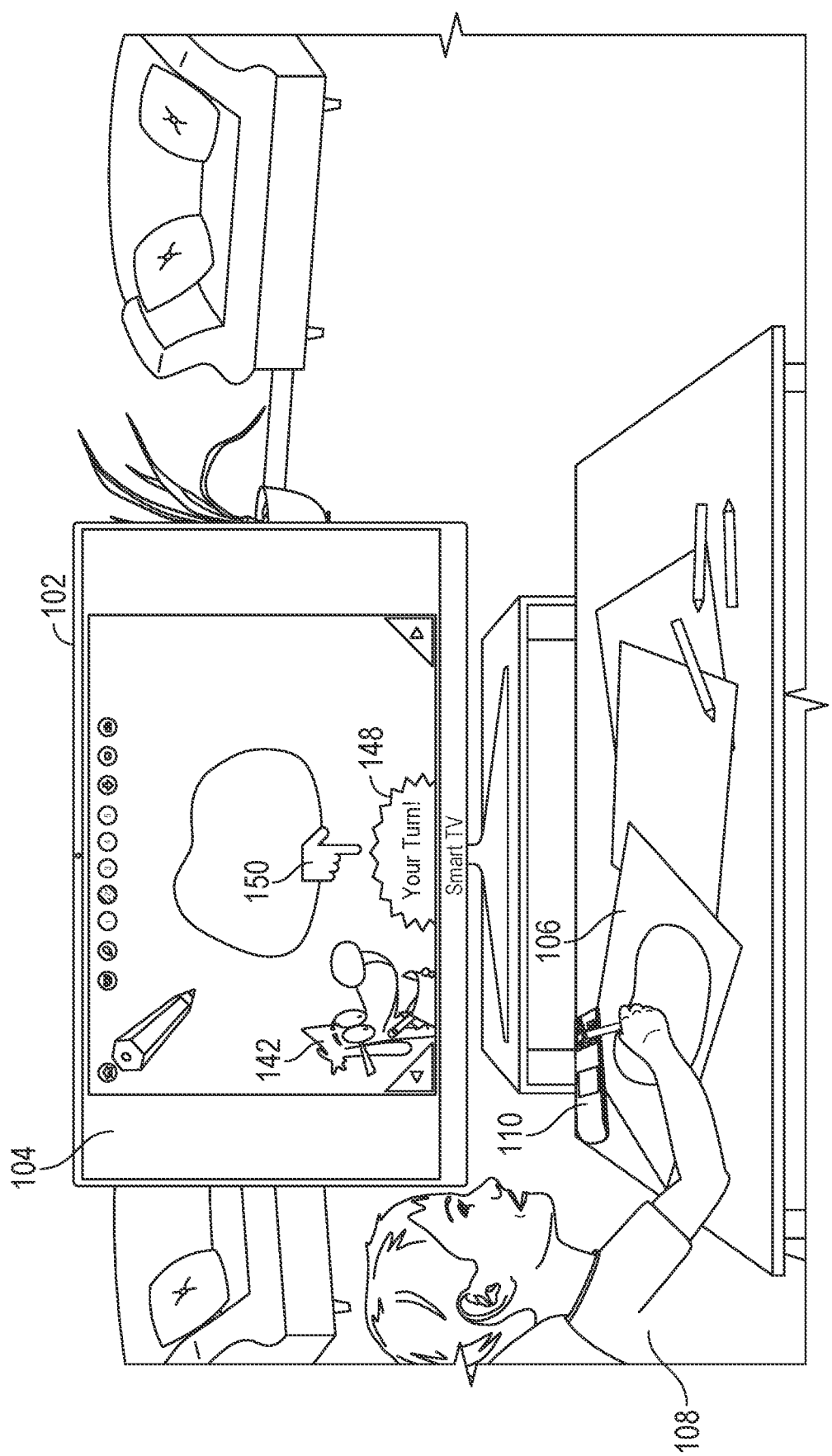
FIG. 1 depicts an exemplary engagement model in accordance with a drawing direction interface.

FIG. 1 illustrates an exemplary engagement model in accordance with the drawing direction interface. Under the exemplary engagement model, a user interacts with both an electronic device and a physical medium to improve his or her physical drawing techniques. In the depicted example in FIG. 1, user 108 creates a physical drawing by interacting with physical medium 106 and electronic device 102, which executes a drawing application implementing the drawing direction interface.

The drawing application provides drawing directions to a user via a "Tap, Watch, and Draw" mechanism. The "Tap, Watch, and Draw" mechanism allows the user to directly engage with the drawing directions provided by the drawing application and create artwork on the physical medium at his or her own pace. In the depicted example, the drawing application provides a first drawing direction, on display screen 104, in the form of an animation of a pencil drawing a circle. After playing the animation, the drawing application displays a graphical user interface ("GUI") element 148, which prompts user 108 to follow the provided drawing direction on a physical medium. When user 108 finishes drawing according to the given drawing direction on physical medium 106, user 108 provides an input to play the next drawing direction using, for example, remote control 110. More details of the "Tap, Watch, and Draw" mechanism are discussed below.

In some embodiments, the drawing application features content associated with a creative entity. An exemplary creative entity is DreamWorks Animation LLC of Glendale, Calif. For example, the drawing application can feature content, such as drawing subjects, in the likeness of computer-animated characters from computer-generated movie titles created by the creative entity. In the depicted example in FIG. 1, the first drawing direction is part of a set of drawing directions for drawing the character named Oh in the computer-animated movie title Home created by DreamWorks Animation LLC of Glendale, Calif. Association with creative entities can evoke feelings of familiarity and excitement from users, which beneficially promotes the learning process.

In some embodiments, the drawing application includes a virtual host component. For example, the drawing application uses audio and visual outputs to simulate a virtual host reacting to the drawing directions and interacting with the user of the drawing application. In some embodiments, the virtual host is in the likeness of a computer-animated character from a computer-animated movie title. As shown in FIG. 1, exemplary virtual host 142 is the character named Mr. Peabody, from the Mr. Peabody & Sherman movie title by DreamWorks Animation LLC of Glendale, Calif. In the depicted example, the drawing application presents virtual host character 142 as listening to and following the drawing direction provided by the drawing application. The presence of the virtual host character provides additional opportunities for the user to engage, play, and learn within the drawing application. More details of the drawing application's presentation of a virtual host are discussed below.

In some embodiments, the drawing application includes a virtual artist component. For example, the drawing application can play a recording of a computer-animation artist providing tips for carrying out a particular drawing direction. As another example, the drawing application can use audio and visual outputs to simulate a computer-animated character giving feedback to the user. Additional interaction dynamics between the virtual host and the user, between the virtual host and the virtual artist, and between the user and the virtual artist are discussed in detail below.

I. EXEMPLARY BASIC FLOW

A. Launching and Navigation

Figure 2A:
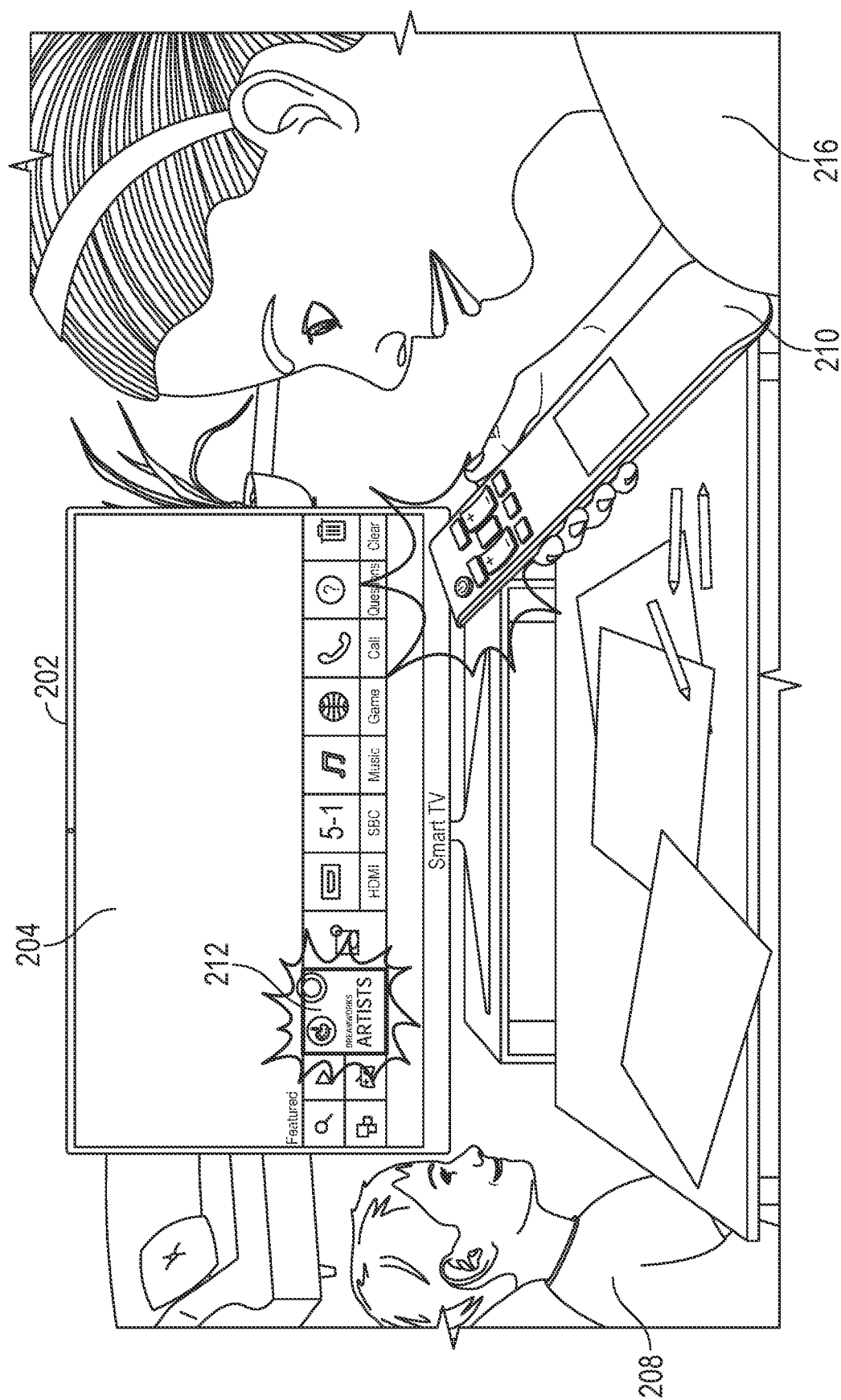

Attention is now directed to an exemplary launching interface that allows a user to access the drawing application, with reference to FIG. 2A. FIG. 2A depicts an exemplary electronic device 202. As can be seen, exemplary electronic device 202 is a television with display screen 204. Electronic device 202 displays, on display screen 204, a number of icons corresponding to different software applications. A user can use remote control 210 to navigate among the icons and select an icon to launch the corresponding software application. In this depicted example, user 216 (e.g., a parent of user 208) uses remote control 210 to navigate among the icons and selects icon 212 to launch the drawing application.

Figure 2B:
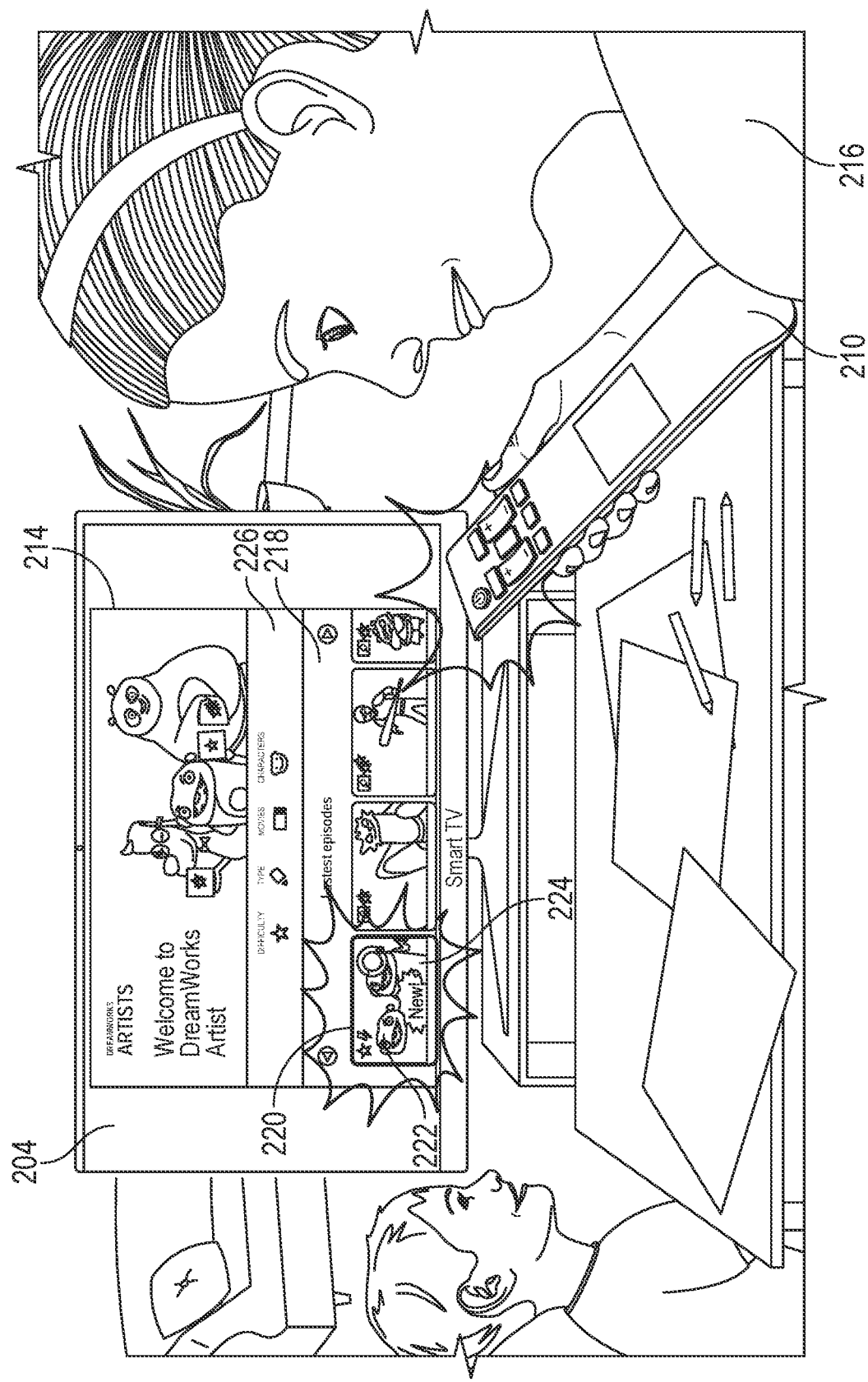

Turning to FIG. 2B, upon user selection of icon 212 of FIG. 2A, the drawing application launches and displays navigation page 214 on display screen 204. Navigation page 214 allows the user to view a summary of available drawing directions for drawing various subjects and to select a particular set of drawing directions. In some embodiments, drawing directions are organized as "episodes", with each episode containing a set of drawing directions for guiding the user to draw one or more subjects.

In the depicted example, navigation page 214 presents four icons, each corresponding to an episode, in sliding GUI element 218. Each icon contains a thumbnail informing the user of the featured subject of the corresponding episode. As can be seen, icon 220 contains a picture 224 of the character named Oh (the subject of the episode) as it appears in the computer-animated movie title Home created by DreamWorks Animation LLC of Glendale, Calif. The thumbnail also contains sketch 222 of the Oh character as a preview of the drawing directions provided by the episode. In some embodiments, navigation page 214 allows categorization of the episodes by date created, featured character, difficulty, and/or movie, as illustrated by GUI element 226. In some embodiments, the user can scroll to the left and/or scroll down to view more icons corresponding to additional episodes on navigation page 214.

Figure 2C:
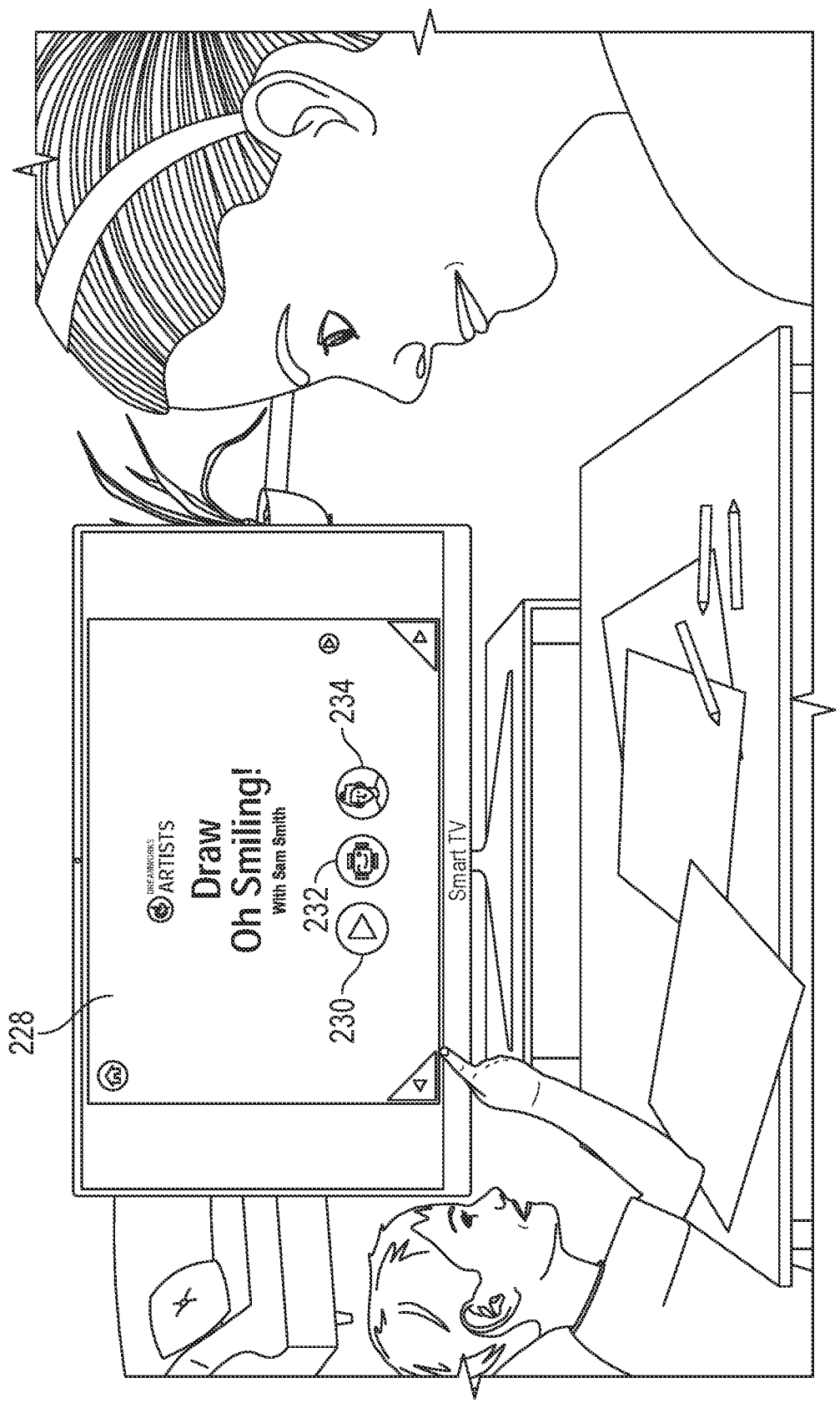

A user can use remote control 210 to navigate among the icons and select a particular icon to launch the corresponding episode. As seen in FIG. 2B, user 216 uses remote control 210 to select icon 220 to launch the corresponding episode featuring the Oh character as the subject. Upon selection of icon 220 in FIG. 2B, the drawing application displays welcome page 228 of the episode, as can be seen in FIG. 2C. Welcome page 228 includes user-selectable icons 230, 232, and 234. Icon 230, when selected, allows the user to begin display of the episode's drawing directions. Icons 232 and 234 are discussed in detail further below.

B. "Tap, Watch, and Draw" Mechanism

Figure 2D:
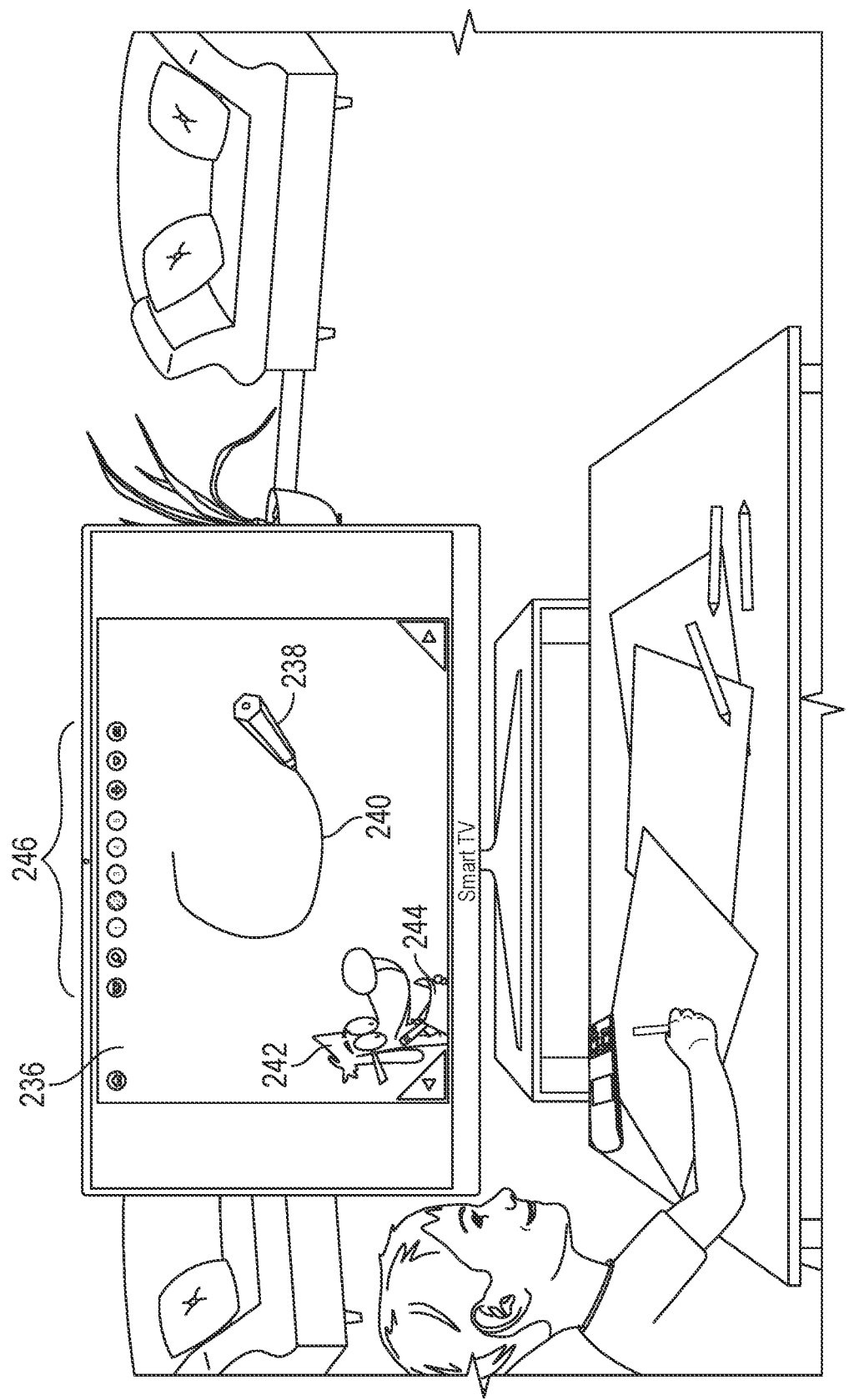

FIG. 2D depicts an exemplary direction interface of the drawing application. At the direction interface, the drawing application provides step-by-step drawing directions for drawing one or more subjects. In the depicted example, direction interface 236 provides a first drawing direction for drawing the face of the Oh character. As can be seen, the first drawing direction includes an animation of pencil 238 drawing a circular line 240 that represents Oh's face. In some embodiments, the animation is accompanied with an audio output providing additional comments related to the drawing of the subject.

In some embodiments, the direction interface displays a virtual host character. The drawing application uses the virtual host character to create additional opportunities for a user to engage with the drawing application. In the depicted example, virtual host character 242 is shown at the bottom left of direction interface 236, and is shown to be creating virtual drawing 244 as the first drawing direction is provided. In some embodiments, a virtual host character is in the likeness of a computer-animated character from a computer-animated movie title by a creative entity. The character can be chosen for its effectiveness at attracting users of specific demographics—for example younger children—to the drawing software application. In the depicted example, virtual host character 242 is the character named Mr. Peabody from the Mr. Peabody & Sherman movie title created by DreamWorks Animation LLC of Glendale, Calif.

In some embodiments, a direction interface includes a progress GUI element for informing the user of how far along he or she is in the drawing process. In the depicted example, progress GUI element 246 includes a plurality of selectable GUI elements corresponding to each drawing direction in the episode to allow the user to go back or skip ahead to a particular drawing direction.

Figure 2E:
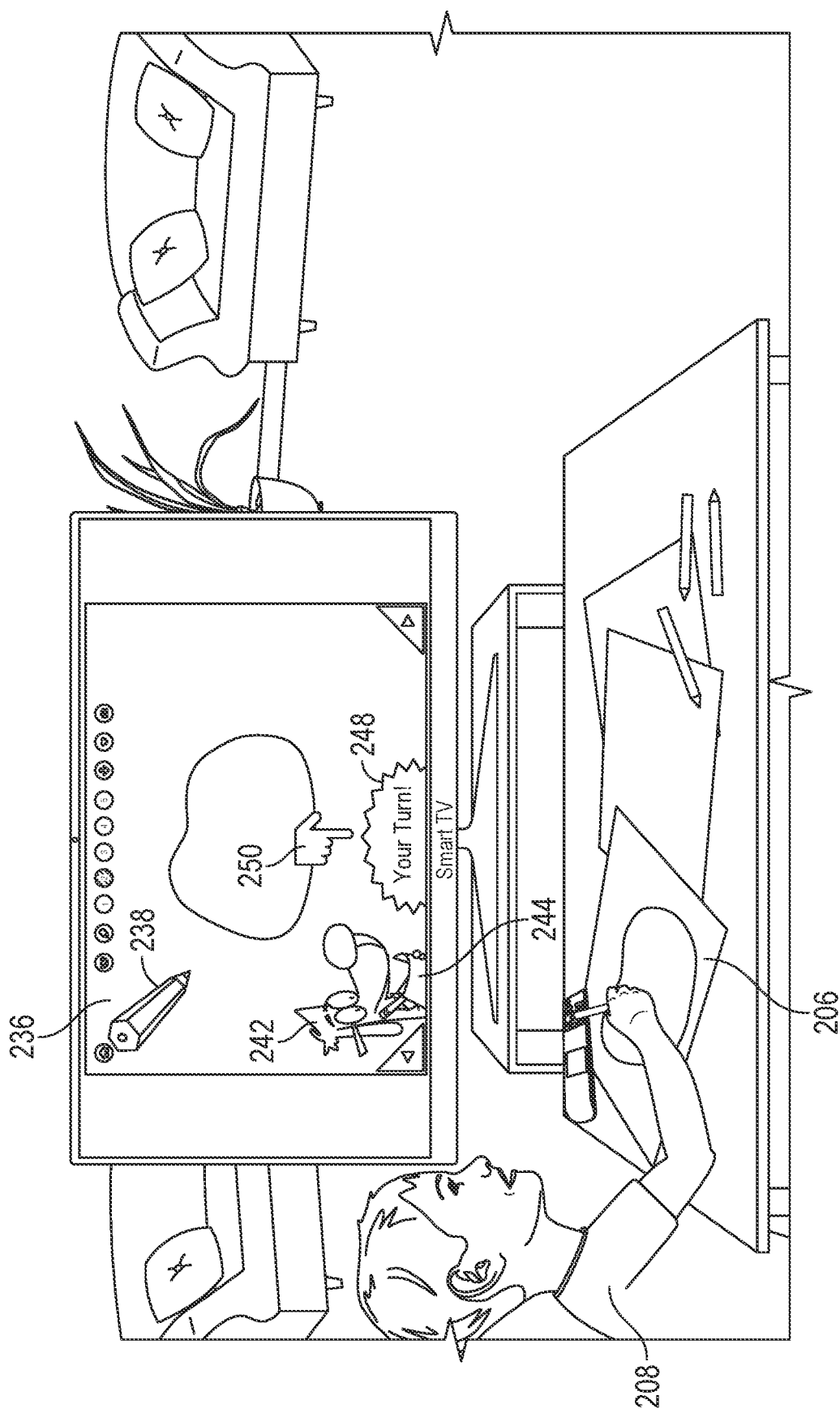

Turning to FIG. 2E, after the first drawing direction is given, direction interface 236 suspends the playing of drawing directions and displays a GUI element that prompts the user to start drawing. The GUI prompt element encourages the user to try following the given drawing direction on a physical medium at his or her own pace. FIG. 2E depicts exemplary GUI prompt element 248. GUI prompt element 248 includes exemplary text ("Your Turn!") on a splash-shaped GUI element. While the drawing application displays GUI prompt element 248, the drawing application also shows pencil 238 to be hovering over the virtual paper without providing additional drawing directions. Additionally, the drawing application shows virtual host 242 to be occupied with creating virtual drawing 244. As can be seen, user 208 follows the given drawing direction and draws on physical medium 206.

Figure 2F:
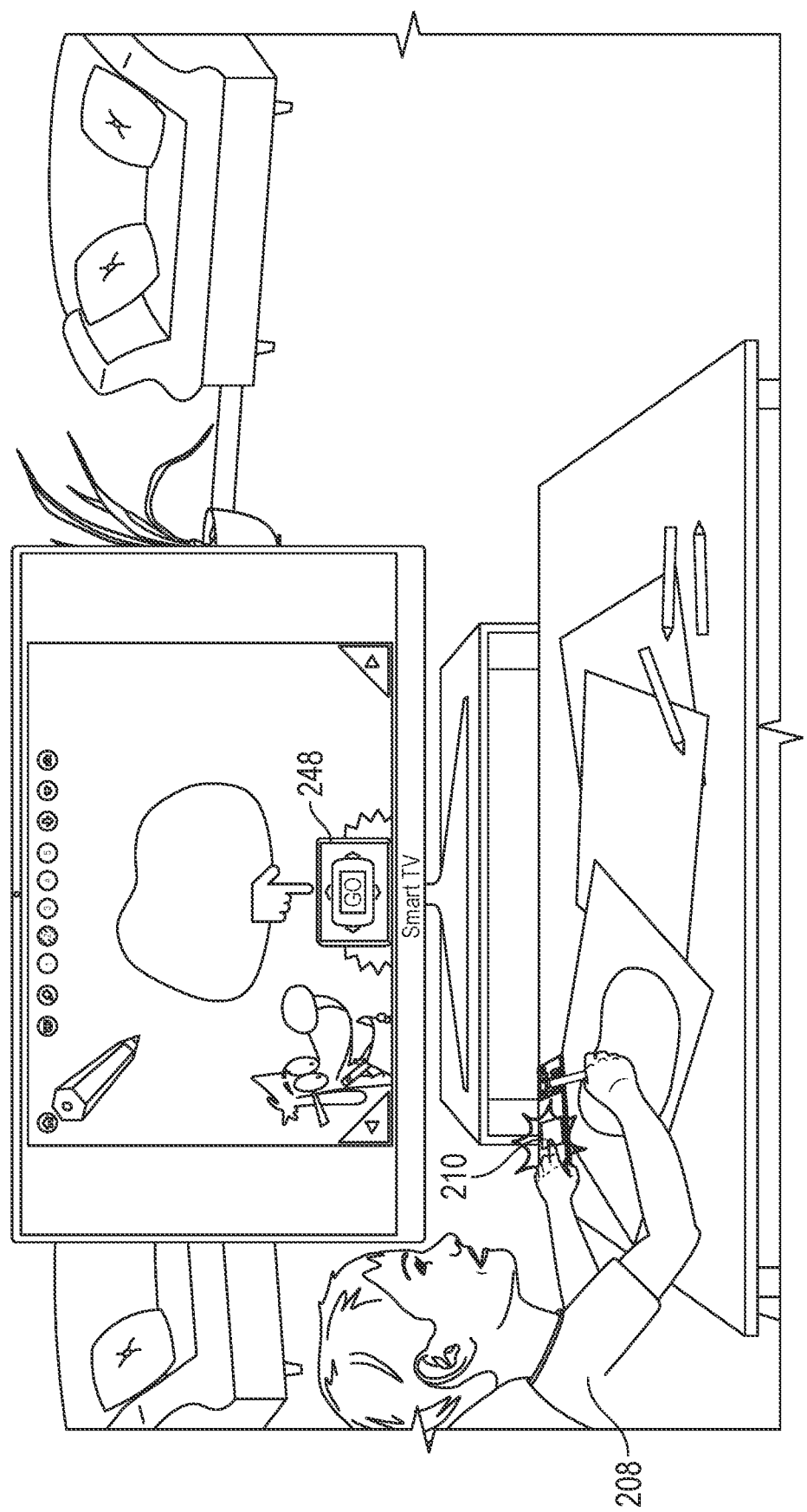

The direction interface 236 provides additional visual cues indicating to user 208 that the drawing application is expecting a particular input to resume the playing of drawing directions. In the depicted example in FIG. 2E, direction interface 236 displays downward hand arrow 250 above the splash-shaped GUI element, suggesting that an input is expected on GUI prompt element 248 when the user is ready to proceed. In some embodiments, additional text (not illustrated) is provided to inform the user of where user input is expected. As can be seen in FIG. 2F, user 208 uses remote control 210 to select GUI prompt element 248 to resume the playing of drawing directions.

Figure 2G:
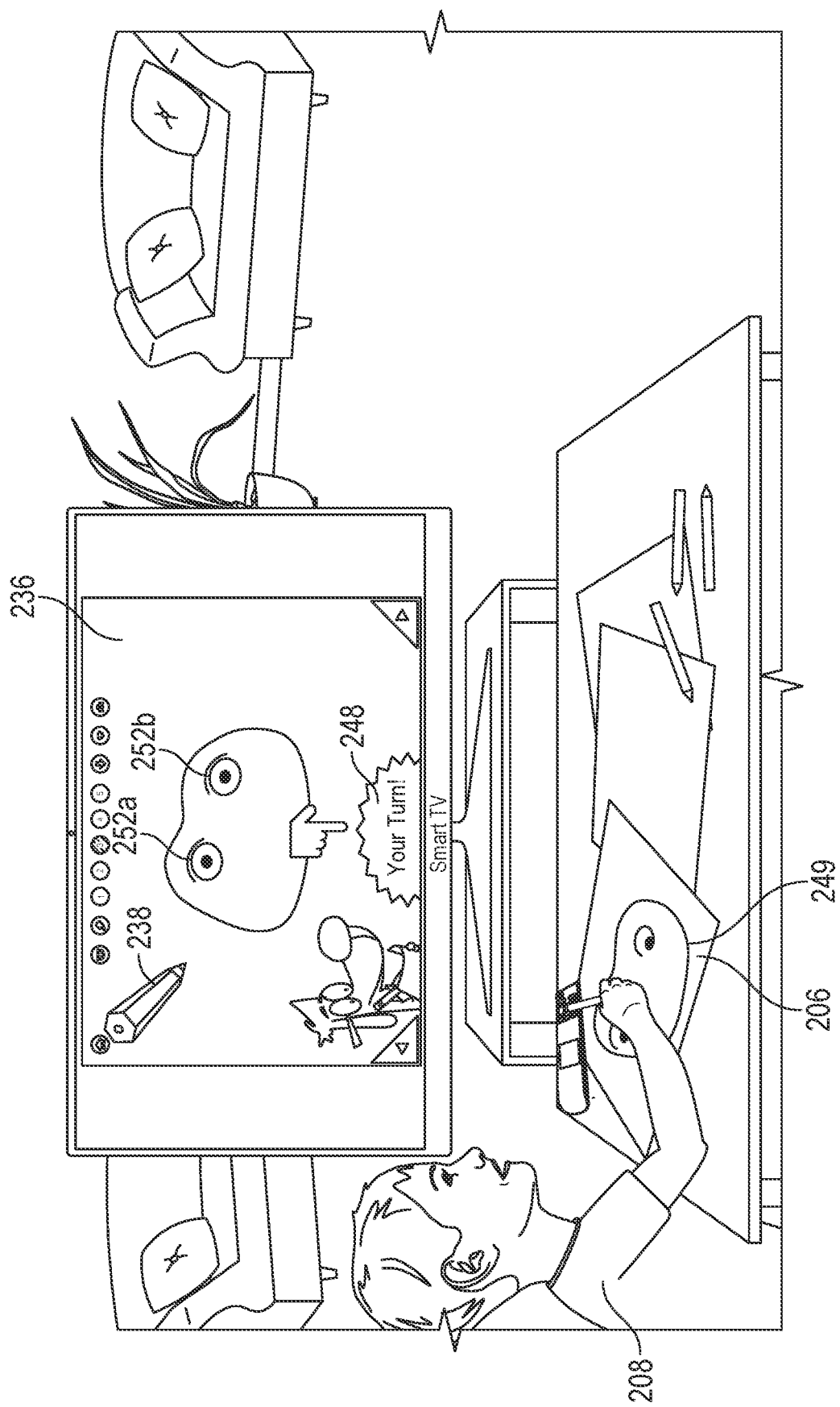

Turning to FIG. 2G, in response to receiving input from user 208, direction interface 236 proceeds to displaying a second drawing direction. In the depicted example, the second drawing direction includes an animation of pencil 238 drawing two eyes 252a and 252b. After playing the animation, direction interface 236 shows GUI prompt element 248. User 208 proceeds to following the second drawing direction and drawing two eyes on his or her drawing 249 on physical medium 206. As can be seen, the drawing application shows host character 242 to be drawing along with user 208.

The above steps of providing a drawing direction, prompting the user to draw on the physical medium according to the given drawing direction, and receiving a user input to provide the next drawing direction are repeated until all of the drawing directions for drawing the subject (i.e., the Oh character) are given. These steps are part of the core functionalities of the "Tap, Watch, and Draw" mechanism.

C. The "Tumbler" Feature

Figure 2H:
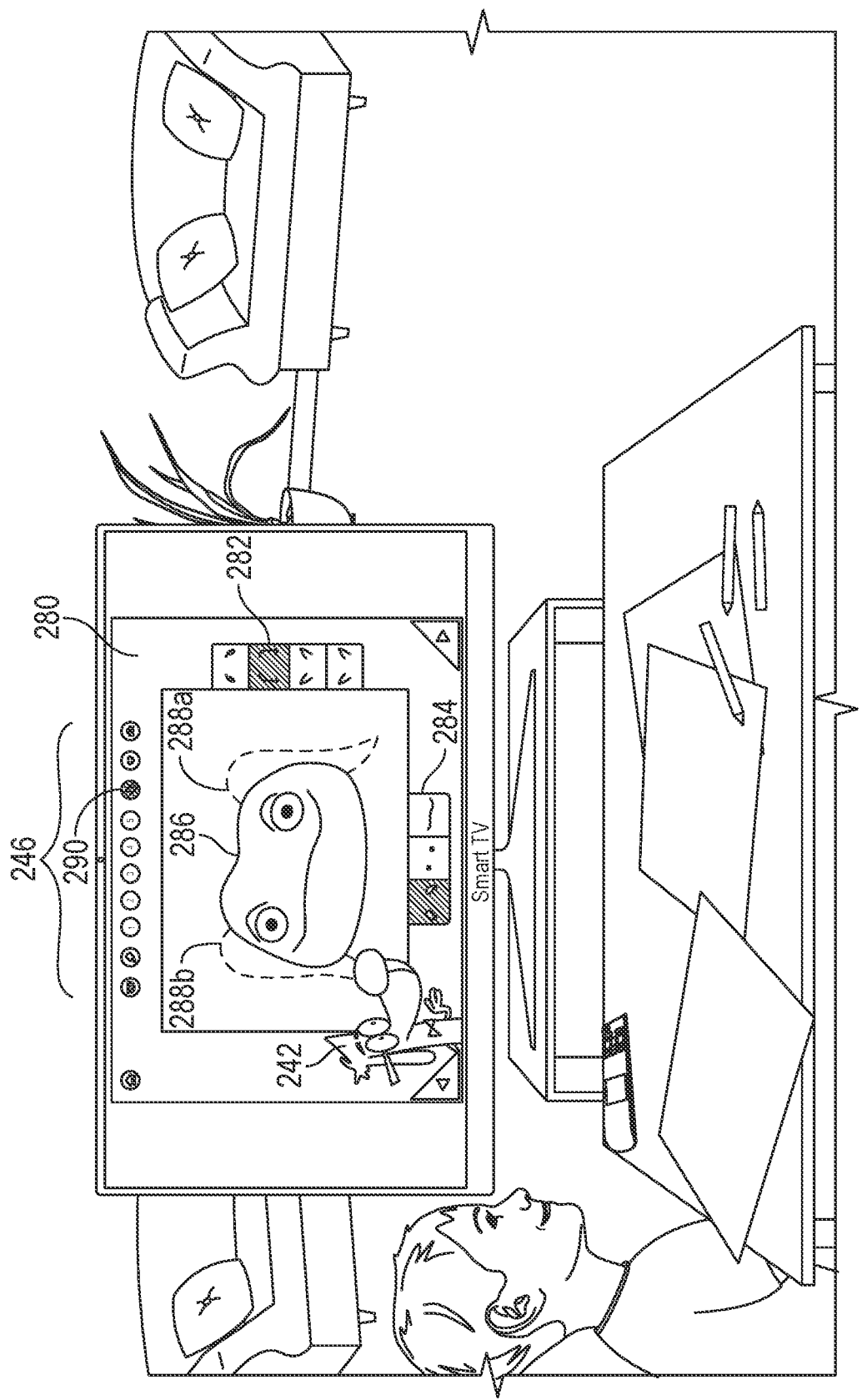
Figure 21:
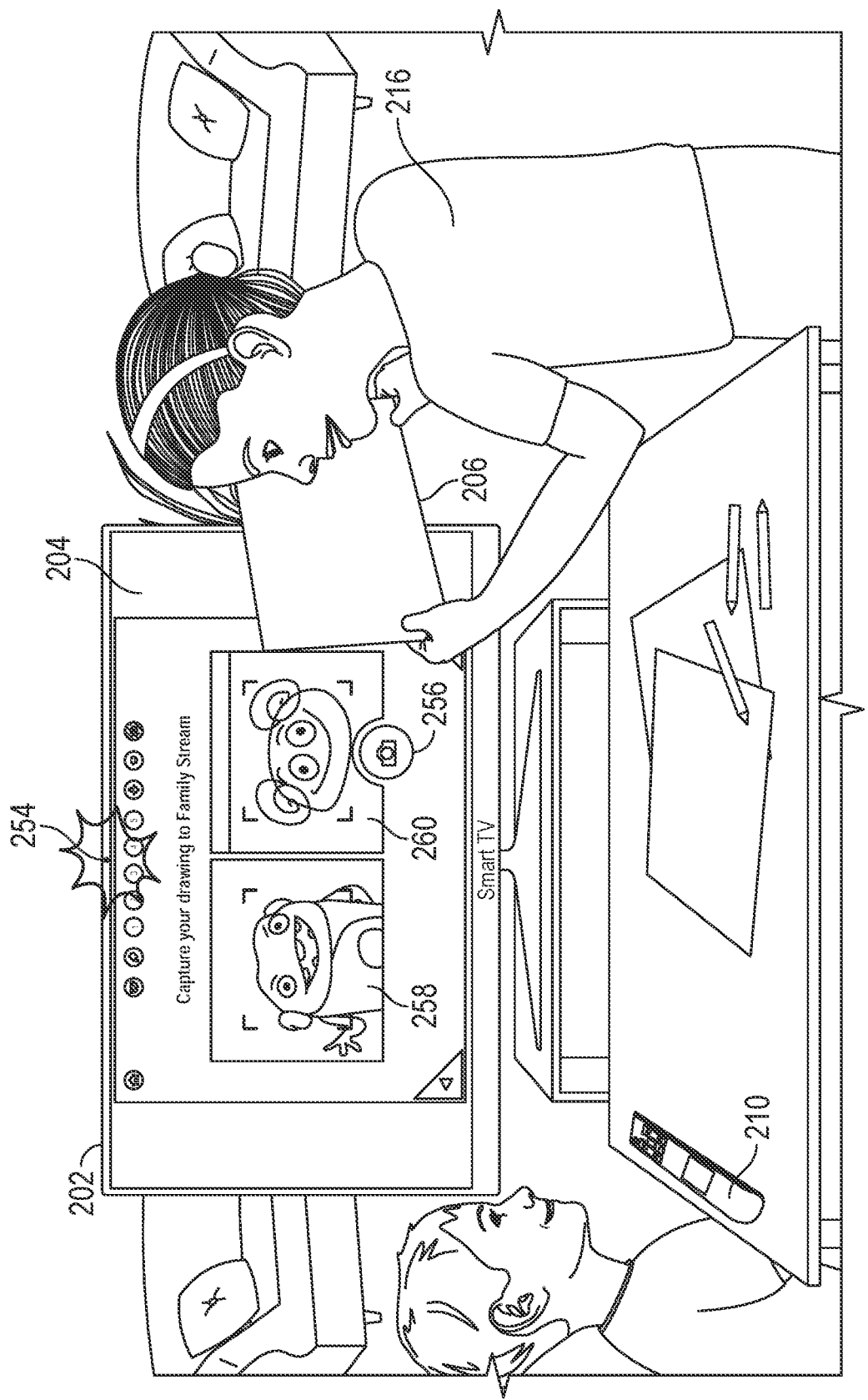

Attention is now directed to an exemplary user interface referred to as a "Tumbler" interface, with reference to FIG. 2H. The Tumbler interface allows a user to view additional drawing directions to create alternative versions of the subject in the episode. FIG. 2H depicts an exemplary Tumbler interface 280 for drawing alternative versions of the Oh character.

As can be seen, Tumbler interface 280 includes visual feature selection GUI element 284 and style selection GUI element 282. Visual feature selection GUI element 284 allows the user to select among a number of visual features of the subject. In the depicted example, visual feature selection GUI element 284 displays the ears, the eyes, and the mouth of the Oh character as selectable options. Style selection GUI element 282 allows the user to, after selecting a particular visual feature using visual feature selection GUI element 284, select alternative styles of the selected visual feature. In the depicted example, style selection GUI element 282 displays various alternative styles of the selected visual feature (Oh's ears). Upon user selection of a particular style, Tumbler interface 280 displays subject 286 with the selected visual feature drawn in the selected alternative style. In the depicted example, Tumbler interface 280 displays Oh's ears 288a and 288b in the selected ponytail style. In some embodiments, the drawing application shows virtual host 242 to be reacting to the user selection of visual features and styles. In some embodiments, the Tumbler interface additionally provides drawing directions in audio and visual format for drawing the selected visual feature in the selected style.

In some embodiments, the drawing application displays the Tumbler interface after a set of drawing directions for drawing a subject has been displayed. This way, the user is able to experiment with different styles for drawing the subject before proceeding to, for example, capturing an image of his or her drawing with a camera and sharing the image. In some embodiments, the Tumbler interface can be accessed at the beginning of an episode. For example, with reference to FIG. 2C, Tumbler interface 280 can be launched from welcome page 228 via selection of icon 232. In some embodiments, the Tumbler interface can be accessed at any point in an episode via selection of icon 290 of progress GUI element 246, with reference to FIG. 2H.

D. Capturing and Sharing

In some embodiments, the drawing application allows a user to capture an image of his or her completed drawing. FIG. 2I illustrates an exemplary interface for capturing an image of the user's drawing. As can be seen, user 216 (e.g. a parent) holds up physical medium 206, which contains the completed drawing, and faces the drawing toward camera 254 of electronic device 202. In some embodiments, the drawing application allows the user to use remote control 210 to select icon 256 to capture an image. After camera 254 captures an image of the drawing on physical medium 206, the drawing application displays exemplar image 258 and captured image 260 side-by-side on display screen 204.

The captured image is stored for future accessing and sharing. In some embodiments, the captured image is stored on a remote server. In some embodiments, the captured image is associated with an account associated with the user who created the drawing. In some embodiments, the account is a family account associated with a group of users (e.g., family members).

In some embodiments, the drawing application allows the user to share his or her artwork with others and view the artwork of other users. FIG. 2J illustrates user 262 (e.g., a parent) selecting, using remote control 210, icon 264 to launch an application for viewing a plurality of artwork. In response, electronic device 202 displays a graphical user interface such as the one shown in FIG. 2K.

Figure 2K:
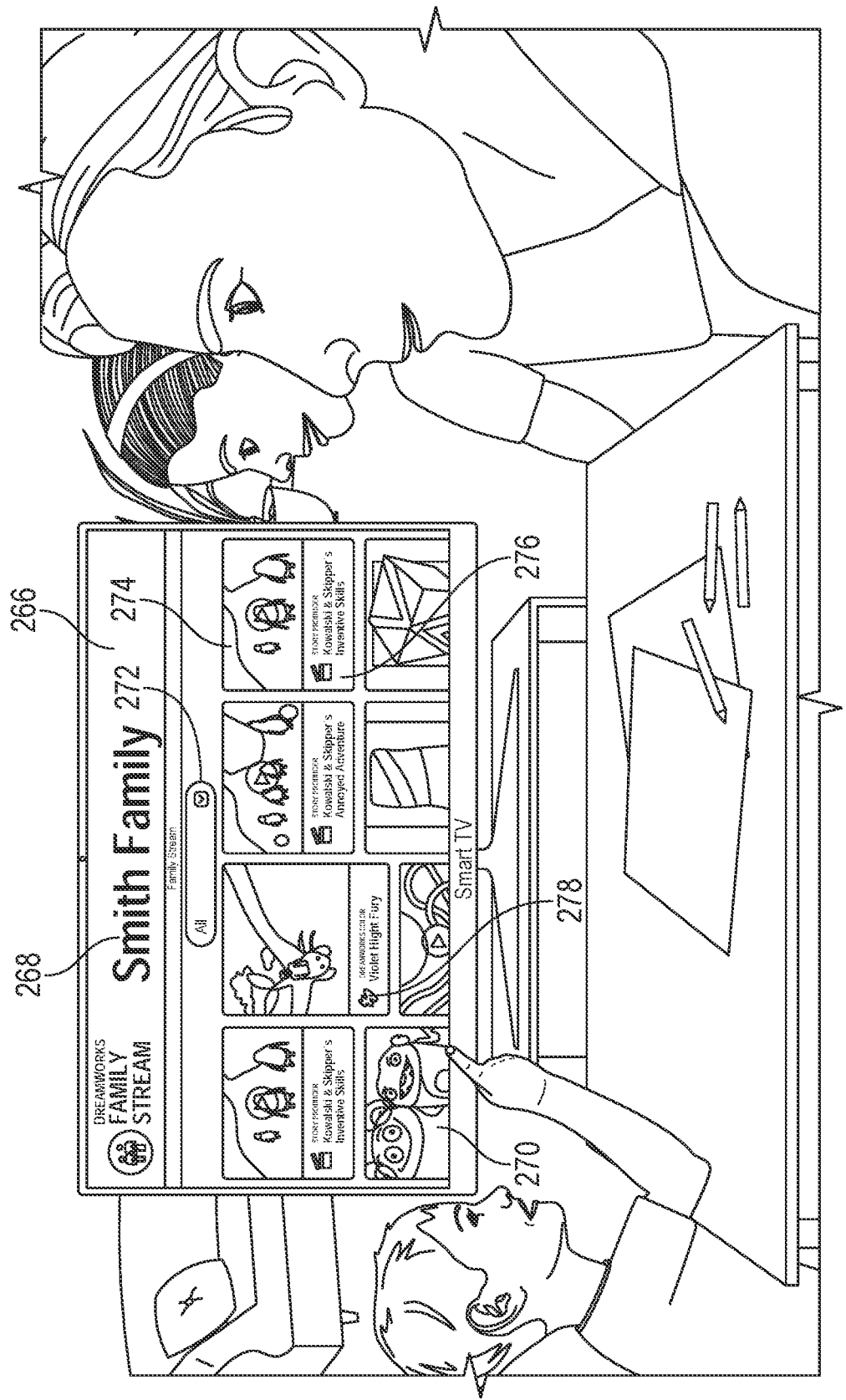

FIG. 2K illustrates an exemplary sharing interface for viewing a plurality of artwork created by a group of users. In some examples, the group of users represents a family, including a first user representing a first child and a second user representing a second child. In the depicted example, family name identifier 268 ("Smith Family") of sharing interface 266 identifies the group whose artwork is displayed. As can be seen in FIG. 2K, icon 270 of sharing interface 266 includes an image of the drawing of the Oh character created by the user in accordance with the examples described above with respect to FIGS. 2D-2G. Sharing interface 266 also depicts other icons (e.g., icon 274) representing artwork created by other users of the Smith Family group. At sharing interface 266, a user can select his or her own artwork or the artwork of other users to, for example, view, comment, and/or provide an indication that the user "likes" the artwork. Sharing interface 266 also includes GUI element 272 for filtering the displayed artwork by, for example, user, artwork type, application associated with the artwork, or the like.

It is noted that the functionality of sharing interface 266 is not limited to displaying images of artwork created according to the drawing application as described herein. Sharing interface 266 can display other types of media content created according to other applications. Examples of other types of media content include: a computer-animated scene, a computer-animated object, a computer-animated character rig, a computer-animated character rig skin, a virtual painting or drawing, or the like. Examples of applications other than the drawing application include: a coloring application (as signified by indicator 278), a story producer application (as signified by indicator 276), or the like. Accordingly, sharing interface 266 provides a convenient and centralized interface for a user to interact with media content from various applications and by various users.

II. ADDITIONAL EXAMPLES AND FEATURES

Figure 3A:
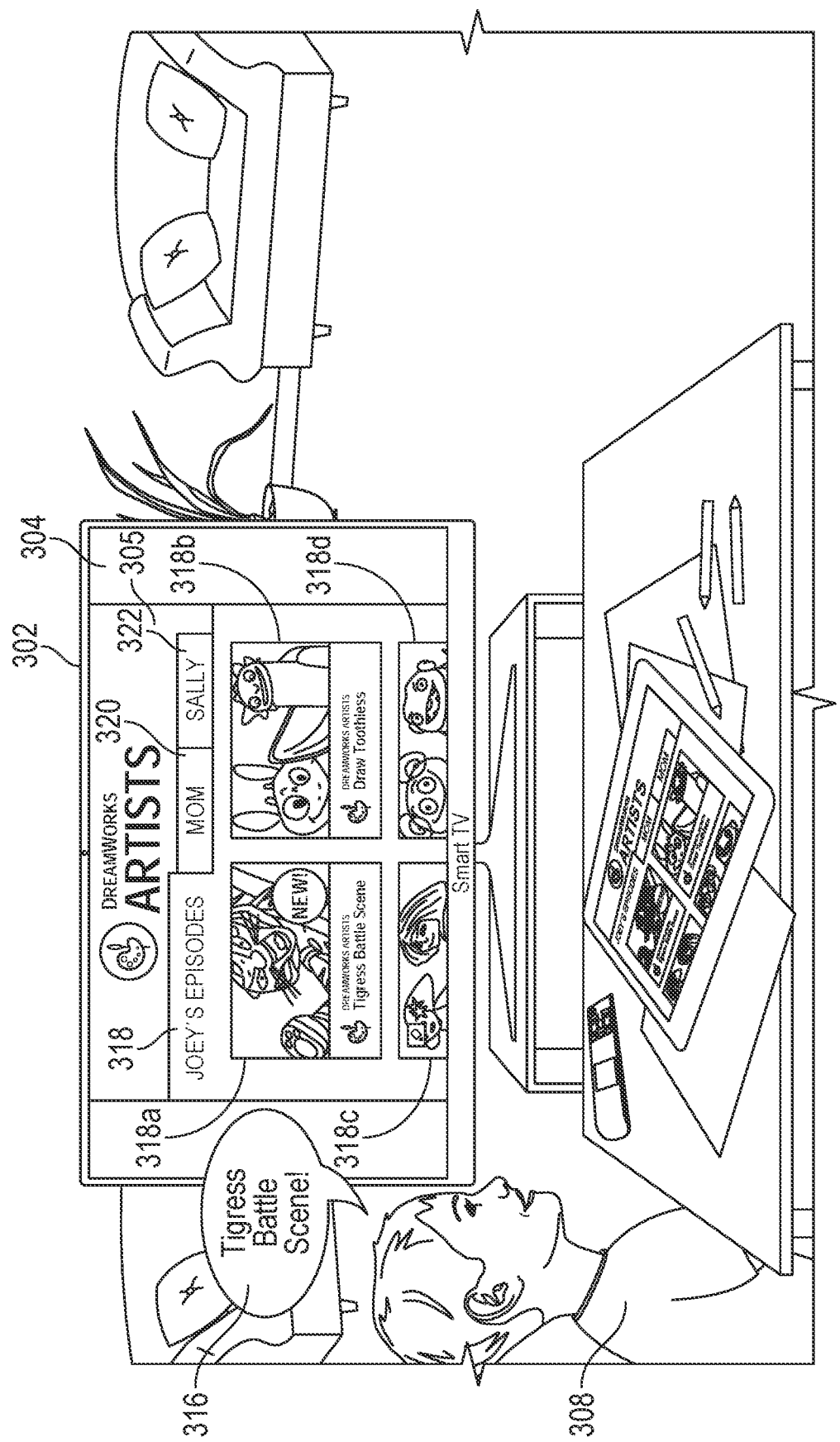
FIGS. 3A-3N depict exemplary user interfaces provided by embodiments of the drawing direction interface.

FIGS. 3A-3N illustrate additional examples of the operation of an exemplary drawing application, and will be used to describe, in detail, various features of the drawing application. One of ordinary skill in the art would appreciate that the features described below with respect to FIGS. 3A-3N may be combined with each other or with the features described above in any manner in order to effectuate a digital user interface that provides drawing directions to guide the user to create artwork on a physical medium.

A. Audio User Input

The drawing application accepts user input via any input unit of an electronic device executing the drawing application and in any format supported by such input unit. In some embodiments, the drawing application accepts audio user input.

Figure 3B:
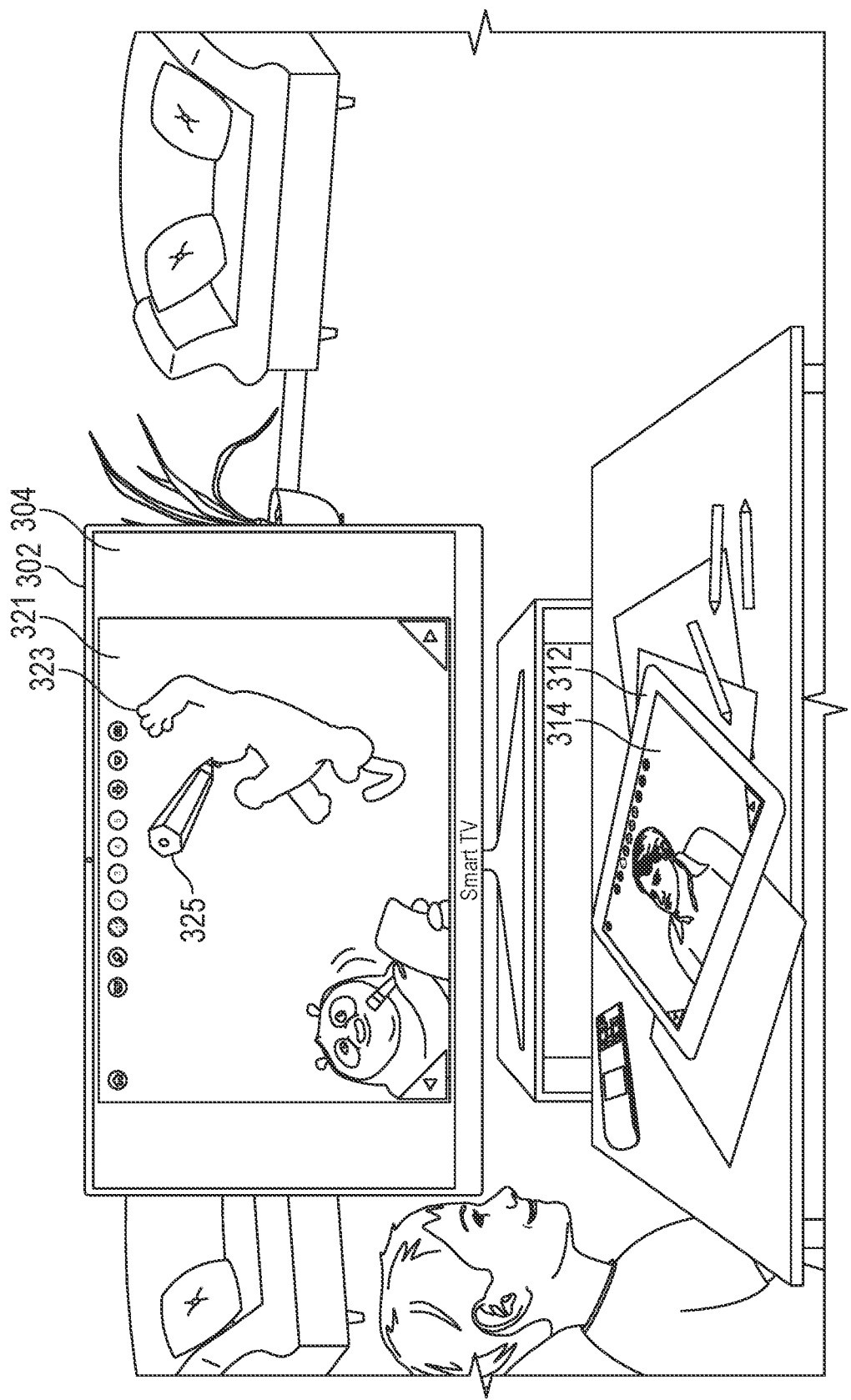
Figure 3C:
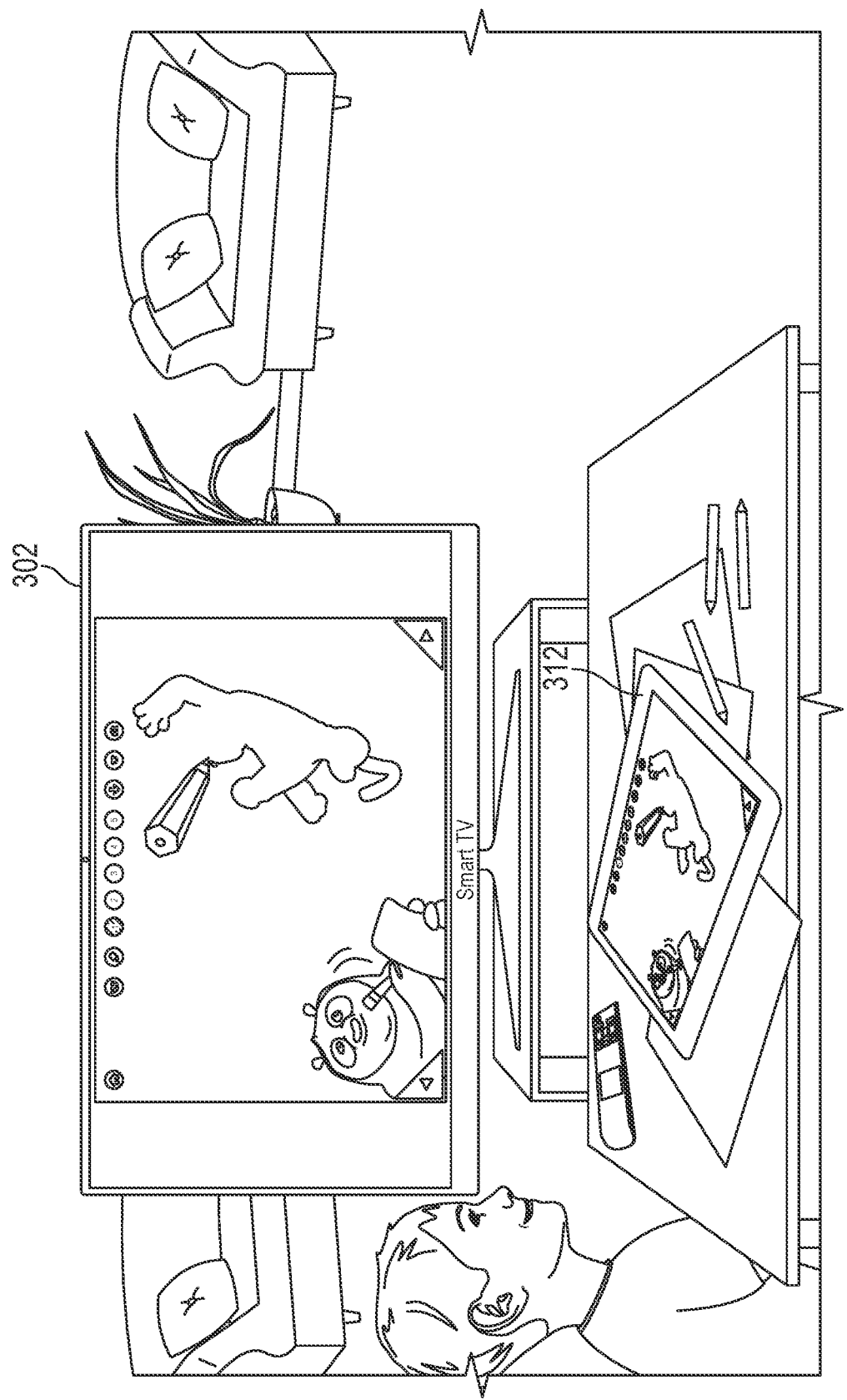
Figure 3D:
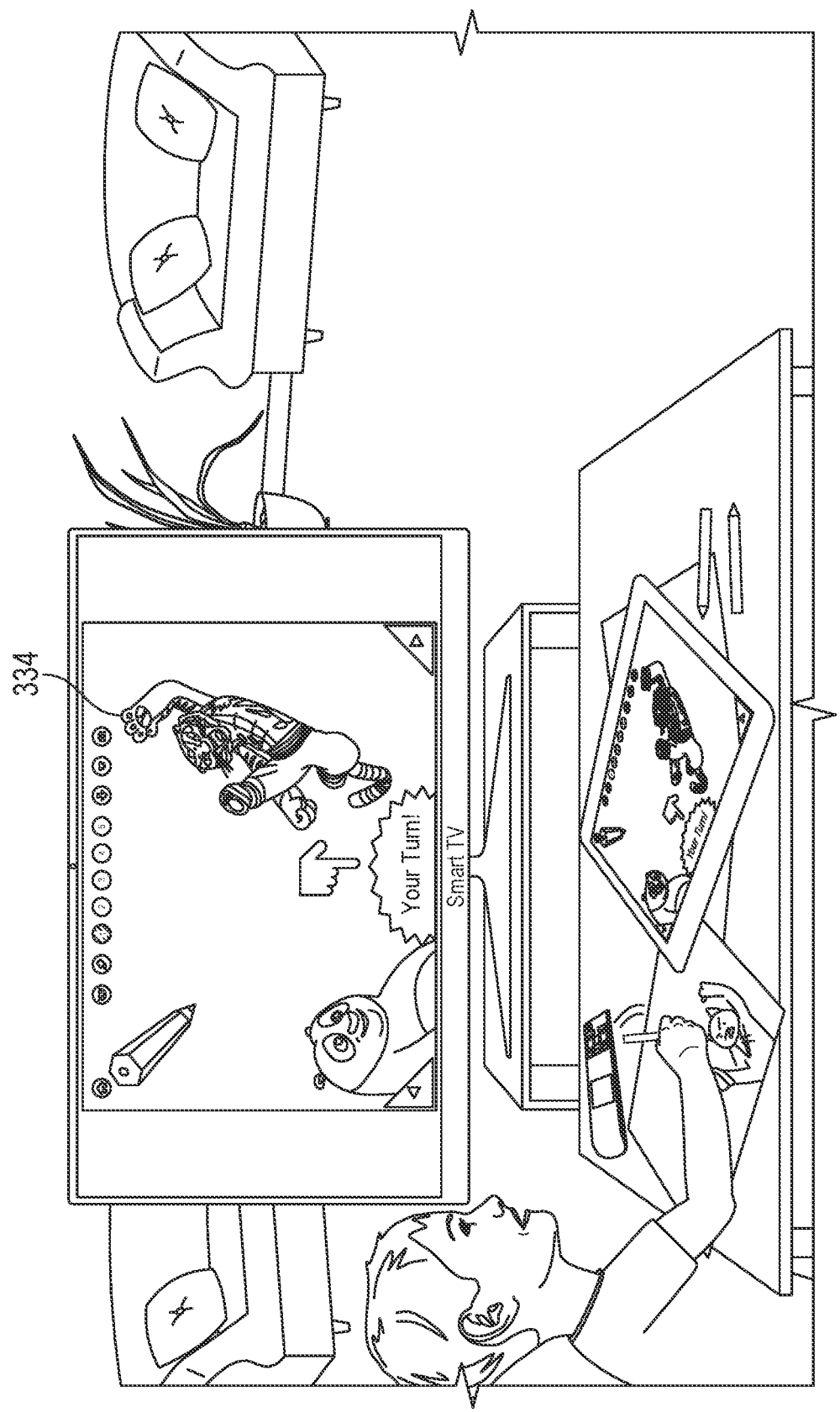

As an example, the drawing application accepts audio user input for navigating through the episodes and selecting an episode. For example, FIG. 3A depicts navigation page 305, displayed on display screen 304 of electronic device 302. Navigation page 305 is similar to navigation page 214 (of FIG. 2B) in functionality, but represents an alternative interface for presenting episodes for user selection. Navigation page 305 includes tabs 318, 320, and 322, each corresponding to a different user (e.g., Joey, Mom, or Sally). These users may belong to a group of users, such as a family. Under selected tab 318, a plurality of icons 318a-318d is displayed. Each of icons 318a-318d represents an episode of drawing directions. To select a desired icon, a user can use a voice command. For example, FIG. 3A depicts user 308 uttering a command ("Tigress Battle Scene!", as illustrated by speech bubble 316) for selecting the episode represented by icon 318a. In response, the drawing application launches the selected episode and provides drawing directions corresponding to the selected episode. FIGS. 3B-3D illustrate the drawing directions of the selected episode entitled "Tigress Battle Scene" being provided.

Figure 3E:
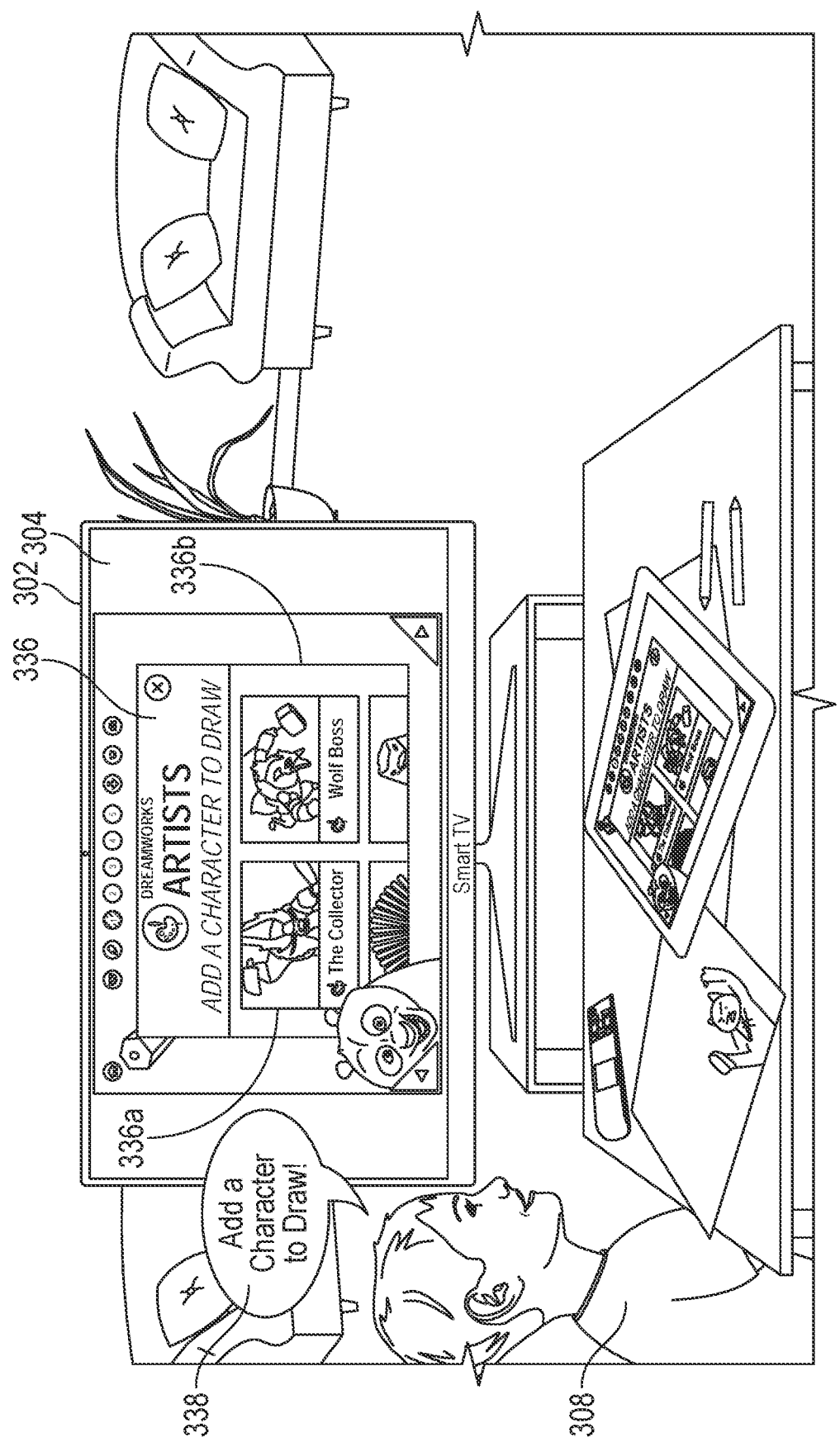
Figure 3F:
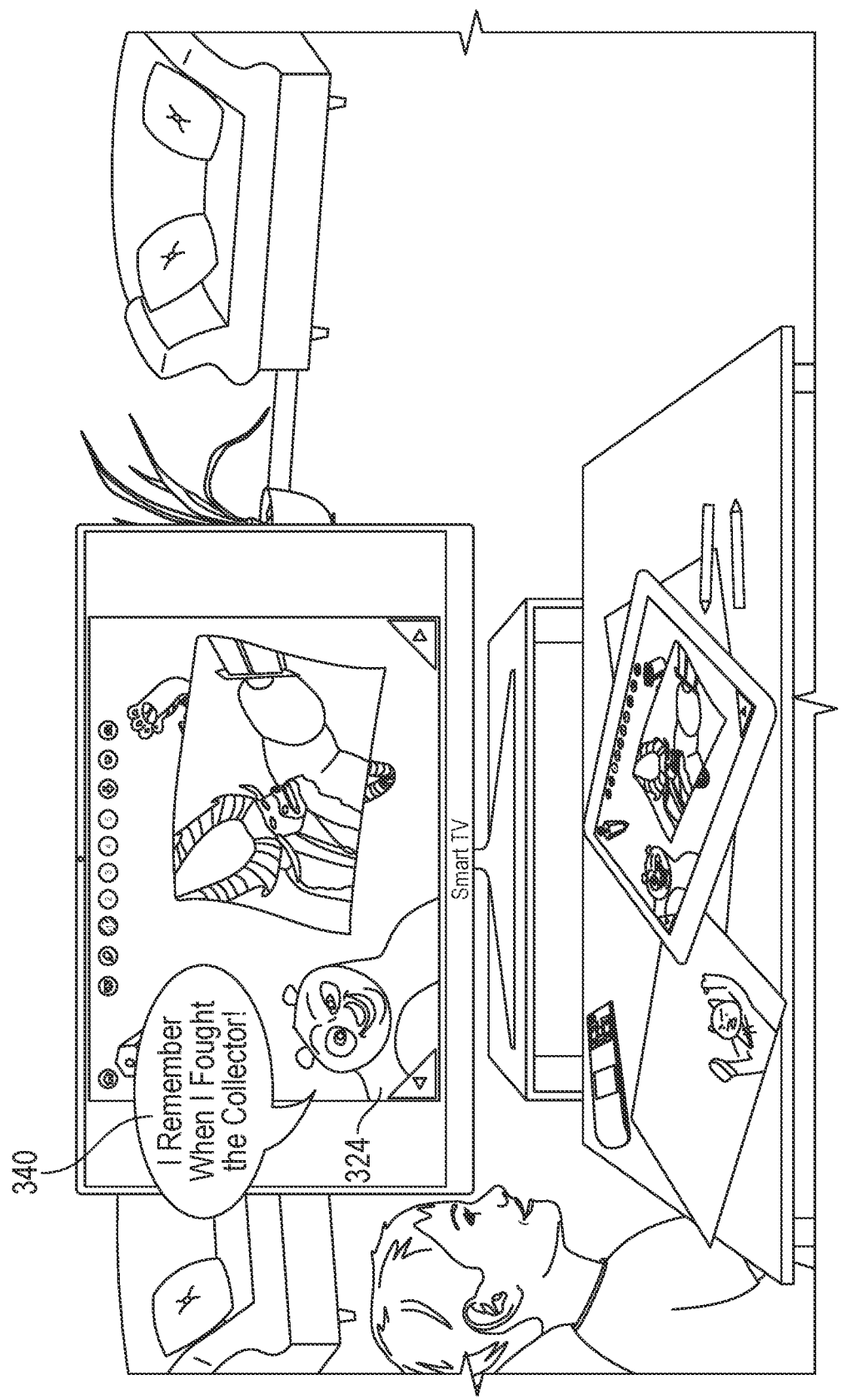
Figure 3G:
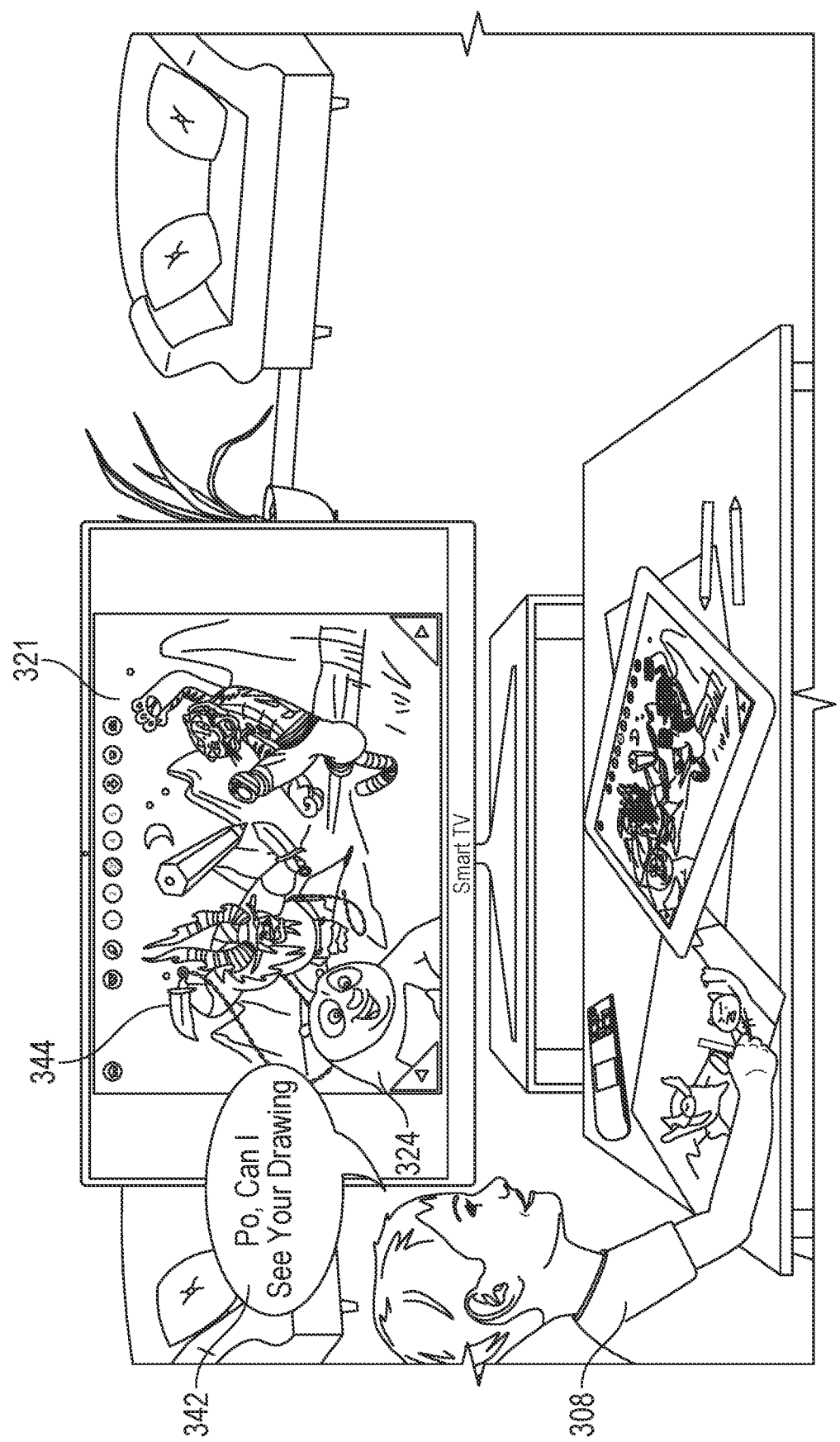
Figure 3H:
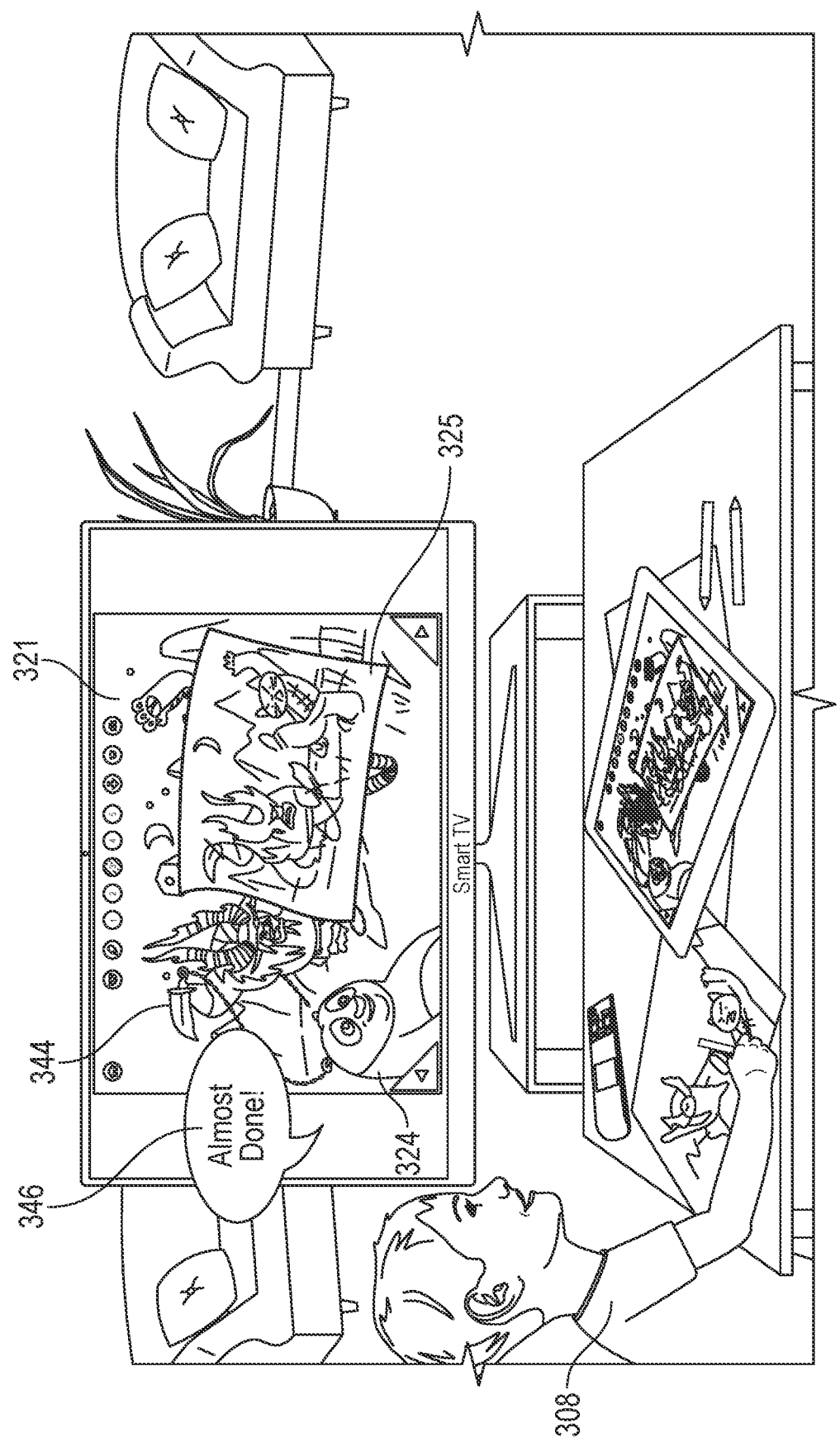
Figure 3I:
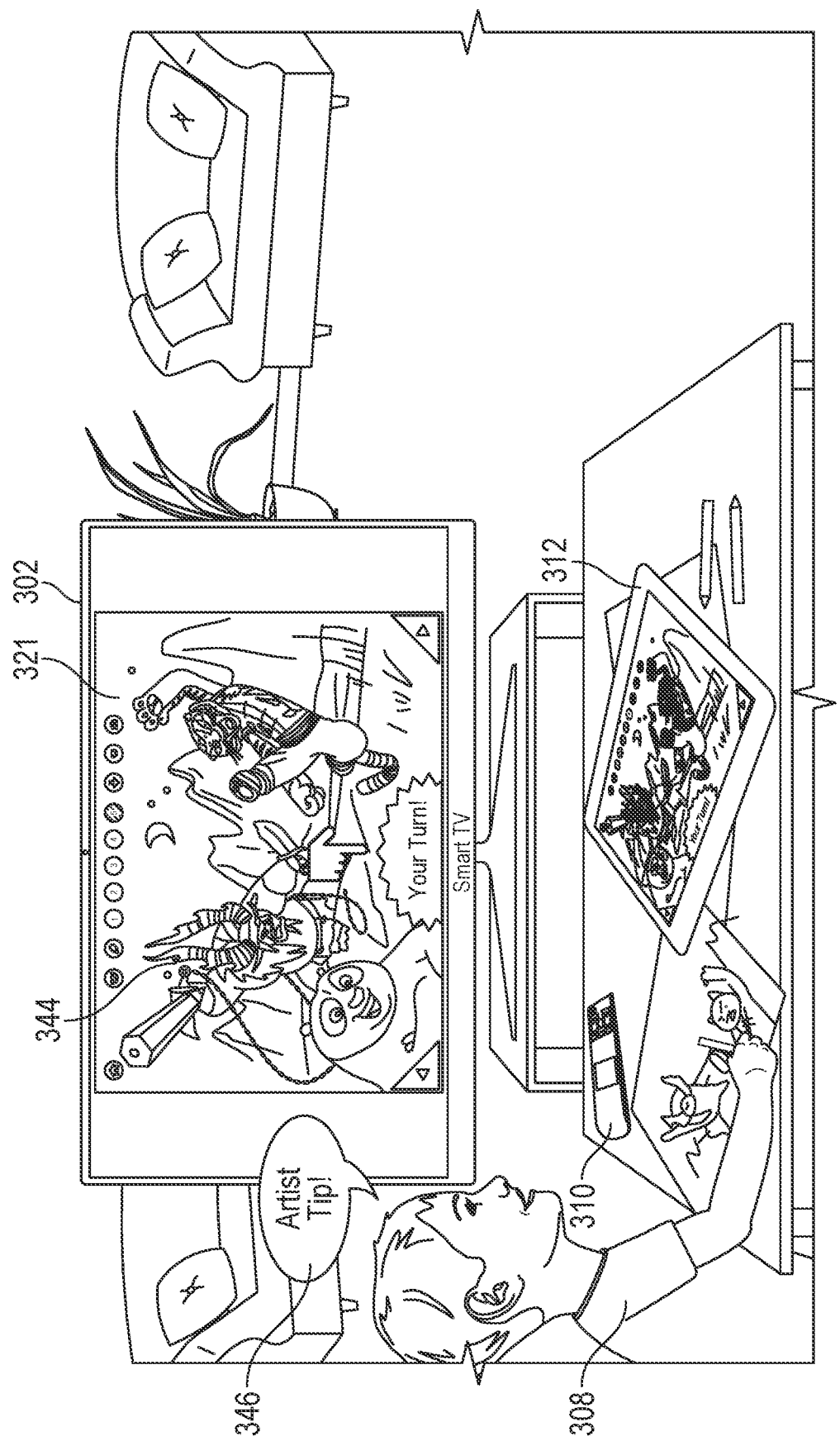
Figure 3J:
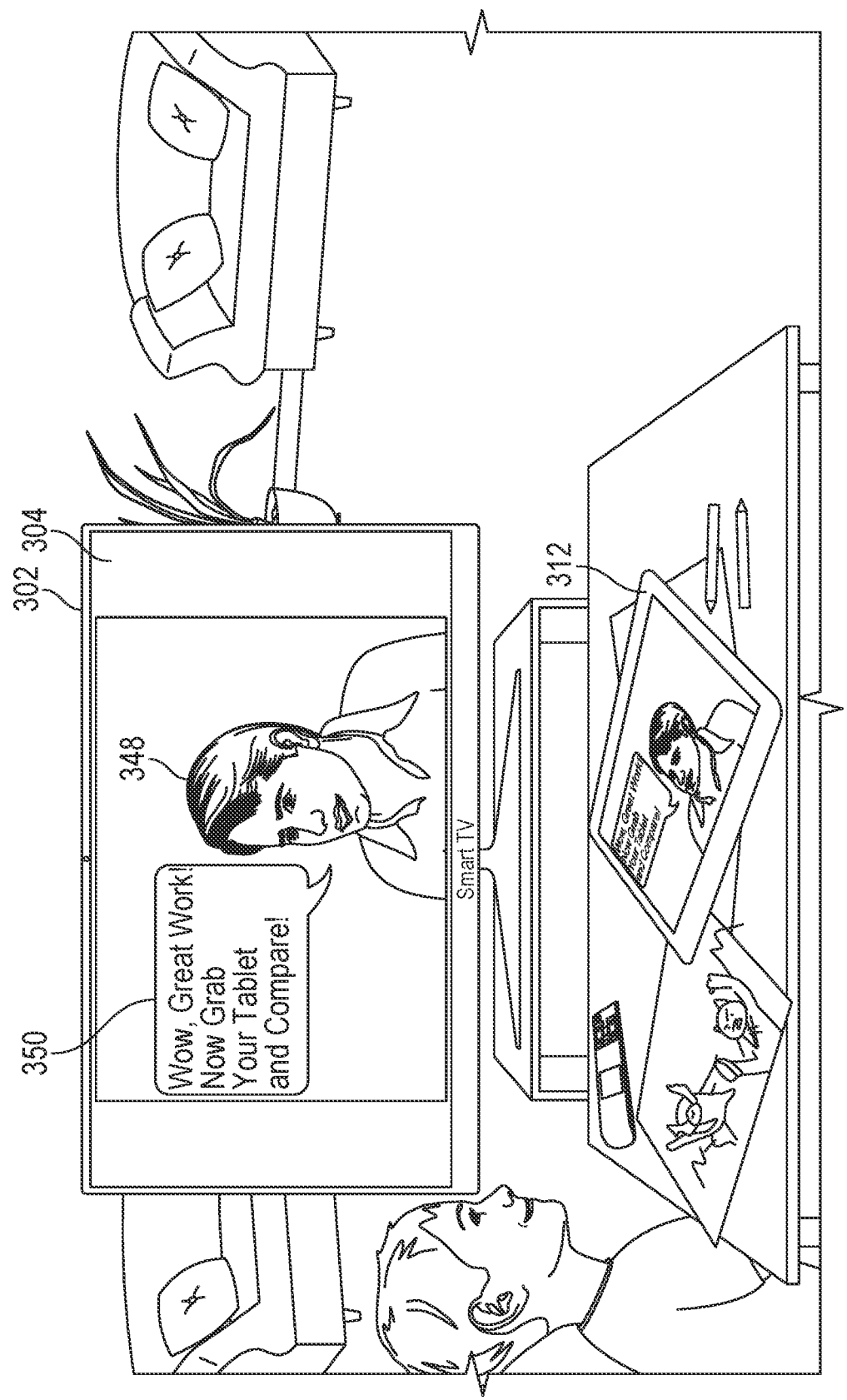

Examples of other audio user inputs supported by the drawing application include inputs for: adding a subject to draw (e.g., illustrated in FIG. 3E); interacting with a virtual host (e.g., illustrated in FIG. 3G); and requesting for an artist tip (e.g., illustrated in FIG. 3I). Each of these features is discussed in more detail below. These examples are not intended to be limiting—audio user input can be accepted for other user inputs for interfacing with the drawing application. Audio user input support allow a user to communicate with the drawing application while continuing to draw on a physical medium. For example, FIG. 3I depicts user 308 drawing on a physical medium while uttering a voice command.

B. Multiple Device Functionality

In some embodiments, the drawing application concurrently uses multiple electronic devices to display content. In some embodiments, the multiple electronic devices display different content. For example, as depicted in FIG. 3B, a drawing direction is displayed on display screen 304 of a first electronic device 302, while a video featuring a virtual artist is played concurrently on display screen 314 of a second electronic device 312. In some embodiments, the multiple devices display the same content concurrently. For example, FIG. 3C depicts electronic device 302 and electronic device 312 displaying the same content.

In some embodiments, the drawing application updates the content displayed on the display screen of one electronic device based on user input received at another electronic device. For example, when a user provides user input at electronic device 312 (e.g., tap on touch-sensitive display screen 314), device 302 updates its display on display screen 304 accordingly.

C. User Interface for Dynamically Updating Drawing Directions

The drawing application allows a user to dynamically update and/or customize the drawing directions during an episode. For example, the drawing application allows the user to add drawing subjects (e.g., characters, objects, or backgrounds) that are not programmed to appear in that episode by default. This aspect of the drawing application is described below with reference to FIGS. 3D-3E.

In FIG. 3D, user 308 has completed the drawing directions for drawing a first subject, character 334 named Tigress. Turning to FIG. 3E, user 308 utters the command "Add a Character to Draw!", as illustrated by speech bubble 338. In response to the user utterance, electronic device 302 displays exemplary subject selection interface 336 on display screen 304. Subject selection interface 336 provides GUI elements, such as GUI elements 336a and 336b, for selecting a character to draw. In some embodiments (not illustrated), subject selection interface 336 also provides GUI elements for selecting other types of subject to draw, such as a background or an object. Each GUI element corresponds to a set of drawing directions for drawing a subject.

At the subject selection interface 336, the drawing application receives user input representing selection of a second subject. In the example of FIG. 3E, user 308 selects (not illustrated) GUI element 336a, corresponding to the character named The Collector. In some embodiments, the drawing application shows a virtual host providing a comment about the user selection. For example, FIG. 3F depicts virtual host 324 providing the comment "I Remember When I Fought The Collector!", illustrated by speech bubble 340. In the example depicted, virtual host 324 is the character named Po, from the Kung Fu Panda movie franchise created by DreamWorks Animation LLC of Glendale, Calif.

In response to receiving the user input representing selection of the second subject (e.g., The Collector), the drawing application concurrently displays the first subject (e.g., Tigress) and a first drawing direction for drawing the second subject. For example, FIGS. 3G-3I illustrate that the drawing directions for drawing selected character 344 (The Collector) are provided to the user on direction interface 321. This feature allows the user to dynamically customize his or her drawing experience to create more complex, challenging, and rewarding drawings to further develop his or her drawing skills.

In some embodiments, the drawing application processes a user input to add a new subject without displaying a graphical interface (e.g., a subject selection interface). For example, the drawing application can process an audio user input and recognize it as referring to a subject related to the current episode. For example, if a user is drawing one or more subjects from the Kung Fu Panda movie franchise and utters the command "I want to draw The Collector!", the application recognizes the voice command as referring to a character from the Kung Fu Panda movie franchise and updates the drawing directions of the current episode accordingly. In other words, the drawing application processes and responds to audio user input based on a theme of the current episode. A theme may be, for example, a computer-animated movie title or a computer-animated movie franchise.

In some embodiments, the drawing application processes an audio user input that refers to a subject that is not related to a theme of the current episode. For example, the drawing application processes and recognizes an audio user input as referring to a subject from a computer-animated movie franchise different than the movie franchise from which the subjects of the current episode originate. For example, the drawing application allows the user to add the Oh character instead of The Collector in the example above.

D. Virtual Artist/Virtual Host/User Interaction Dynamics

The drawing application described herein provides several interaction dynamics that increase user engagement with the featured content and the drawing directions. In some examples, interaction dynamics exist between a user and a virtual host. In some examples, interaction dynamics exist between the user and a virtual artist. In some examples, interaction dynamics exist between the virtual artist and the virtual host. In some examples, one or more electronic devices provide these interaction dynamics concurrently. These interaction dynamics are described in more detail below.

(a). Interaction Between the User and the Virtual Host

In some embodiments, the drawing application outputs visual and audio cues related to the virtual host that simulate behaviors of a drawing buddy. For example, the drawing application allows the user to view the virtual host's virtual drawing. In FIG. 3G, user 308 asks to see the virtual drawing being created by Po (i.e., virtual host 324) by uttering "Po, Can I See Your Drawing?", as illustrated by speech bubble 342. In response to receiving the utterance, the drawing application displays the virtual host's virtual drawing. In FIG. 3H, virtual host 324 Po's virtual drawing 325 is displayed to the user 308. Further, after displaying the virtual drawing, the drawing application can output additional visual and audio cues related to the virtual host to simulate additional behaviors of a drawing buddy. For example, FIG. 3H depicts the output of the comment "Almost Done!" by virtual host 324 Po, illustrated by speech bubble 346.

In some embodiments, a virtual drawing of a virtual host character depicts a drawing mistake. A drawing mistake includes a depiction of one or more portions of the drawing subject drawn in a way that departs from the drawing direction. Presenting the user with the drawing mistake provides an important learning opportunity to the user. This way, the drawing application encourages the user to be creative by illustrating alternative ways of drawing the subject. The drawing application also assures the user that making drawing mistakes is okay, thereby encouraging the continued development of his or her drawing skills.

In some embodiments, the drawing application outputs visual and audio cues related to the virtual host that simulate behaviors of a knowledgeable character from a computer-animated movie title. The output can simulate, for example, comments or reactions attributed to the virtual host character that are contextually relevant to displayed content. In some embodiments, the drawing application provides an output representing an utterance directed to the user from the virtual host, where the utterance is based on a plot of the computer-animated movie title. For example, as shown in FIG. 3F, the drawing application shows virtual host 324 Po to be making a comment ("I Remember When I Fought The Collector!") directed to the user, based on his role in a movie title from the Kung Fu Panda franchise. The virtual host's comment is in response to the user action of adding a character (The Collector) to the drawing scene.

(b). Interaction Between the Virtual Artist and the User

In some embodiments, the drawing application displays a virtual artist for providing additional information to the user. In some examples, the virtual artist is a recording of a computer-animation artist. In some examples, the virtual artist is a computer-animated character. In some examples, the virtual artist may be depicted using a combination of the two formats at various times throughout an episode.

In some embodiments, the drawing application plays a video showing the virtual artist providing drawing directions on how to draw the subject. For example, the video shows the virtual artist drawing the subject on a physical medium. In some embodiments, the drawing application allows the user to request for an artist tip. In the example depicted in FIG. 3I, a user 308 requests for an artist tip by uttering "Artist Tip!" as illustrated by speech bubble 346. Any of the electronic devices 302, 312, and 310 can receive the user utterance. In response to processing the user utterance, the drawing application outputs (not illustrated) an artist tip. The artist tip may feature advice on how to draw the subject. In some embodiments, the artist tip is one or more of: a video or animation of a virtual artist, a text bubble, a drawing animation, or an audio output in the virtual artist's voice.

In some embodiments, a video featuring the virtual artist may be accessed at any time during an episode. In some embodiments, a video of the virtual artist is displayed at the beginning of the episode, for example, upon receiving user selection of icon 234 on welcome page 228, with reference to FIG. 2C.

(c). Interaction Between the Virtual Artist and the Virtual Host

In some embodiments, the drawing application shows the virtual artist and the virtual host to be interacting with each other. In some embodiments, the drawing application provides an output simulating an exchange between the virtual artist and the virtual host. In some examples, the drawing application shows the virtual artist to be treating the virtual host as a secondary student (who draws along with the user) or as a respected character (with reference to its role as a character in a computer-animated movie title). For example, the drawing application can show the virtual artist to be providing encouragement to the virtual host as a student. As another example, the drawing application can show the virtual artist to be commenting on the virtual host's role in a particular computer-animated movie title.

E. Providing Feedback to the User

Figure 3K:
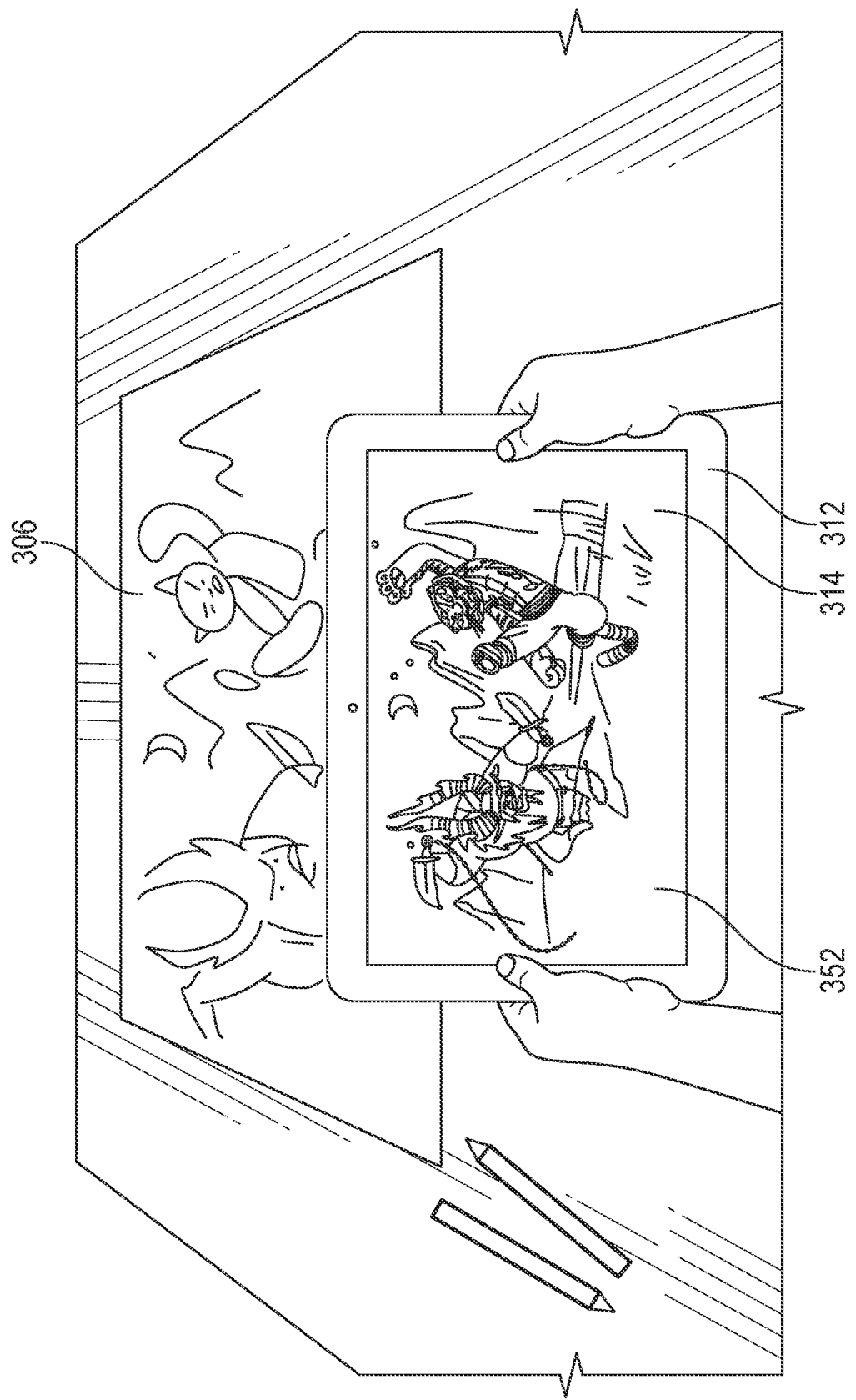

FIGS. 3J-3M illustrate user interfaces for providing feedback to a user based on his or her artwork created on a physical medium. For example, in FIG. 3J, the drawing application displays virtual artist 348 on display screen 304 prompting user 308 to grab his or her tablet (e.g., electronic device 312) to compare drawings, as illustrated by speech bubble 350. Turning to FIG. 3K, display screen 314 of electronic device 312 displays exemplar image 352. The user can hold up electronic device 312 near his or her drawing on physical medium 306 to compare. In this way, the user can gauge his or her progress and evaluate his or her techniques.

Figure 3L:
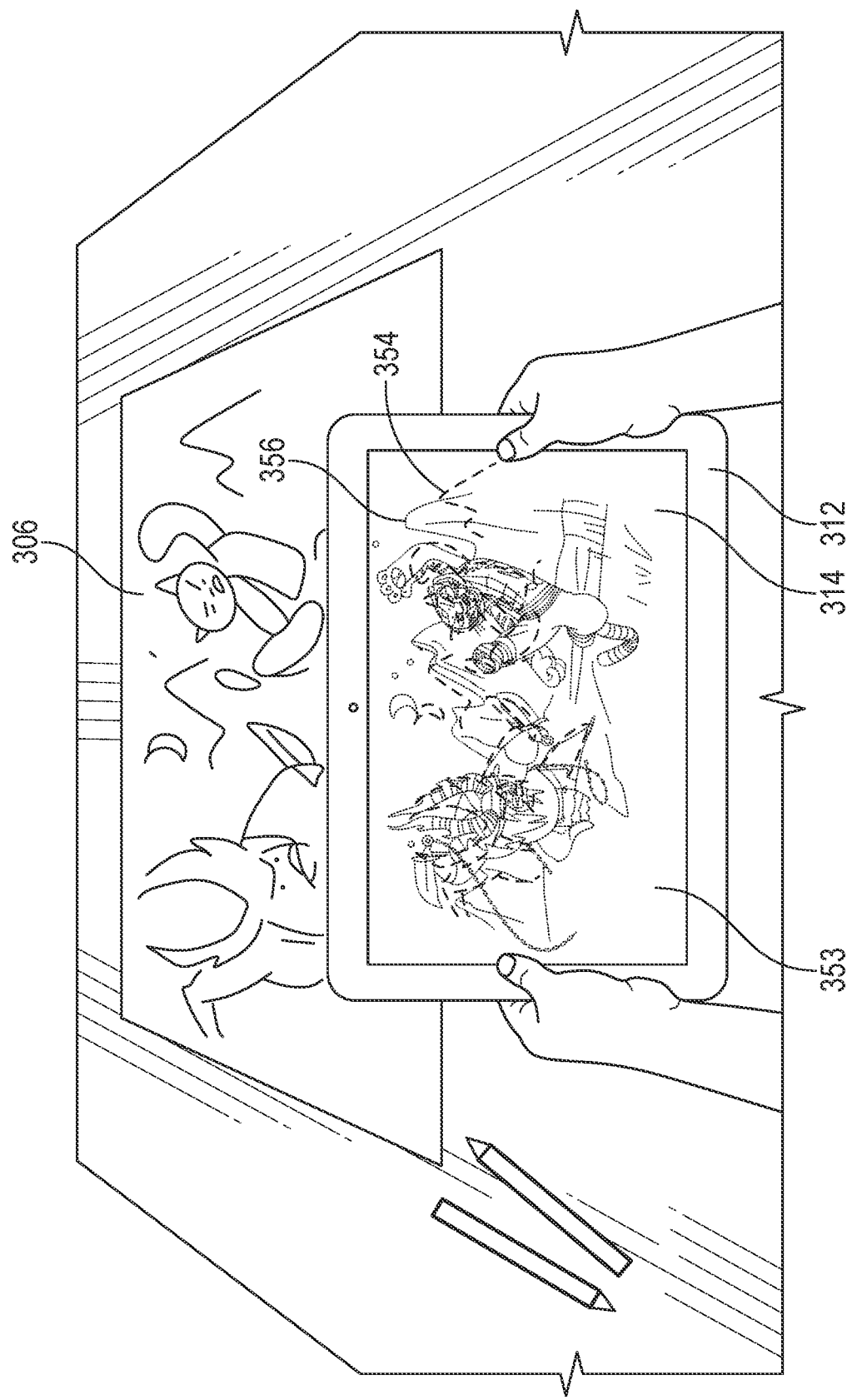
Figure 3M:
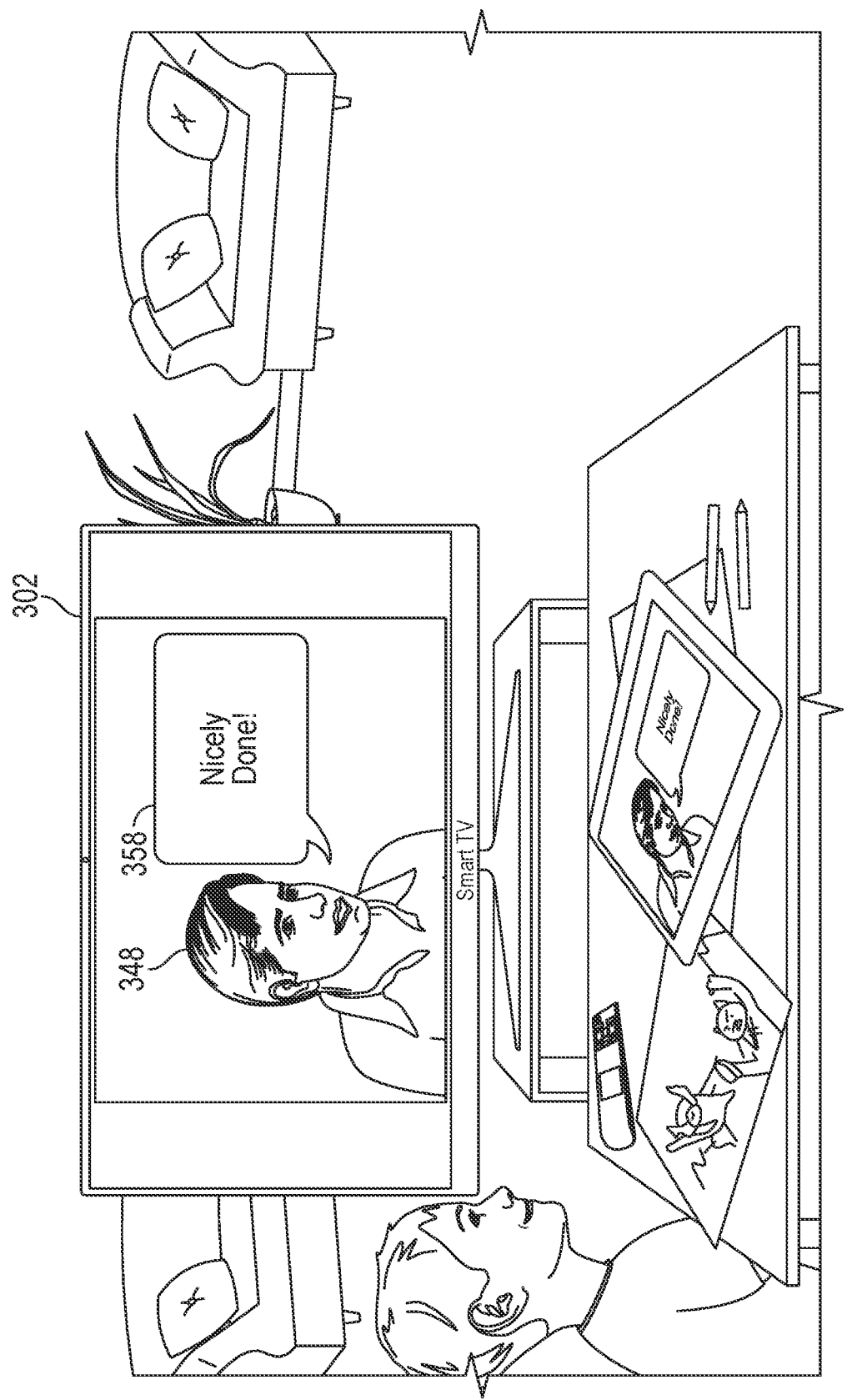

In some embodiments, the drawing application constructs and displays a composite image of an exemplar image and the user's drawing as captured by a camera. For example, the camera of an electronic device, such as electronic devices 302 and 312 of FIG. 3J, can be used. FIG. 3L depicts exemplary composite image 353 displayed on display screen 314 of device 312. Dashed lines 354 of composite image 353 depict the captured image of the user's artwork on a physical medium 306. Dotted lines 356 depict the exemplar image. This feature provides the user with meaningful visual feedback on his or her progress and techniques.

In some embodiments, the drawing application provides customized feedback based on a captured image of the user's artwork on a physical medium. In some embodiments, the drawing application compares the captured image with an exemplar image and displays customized feedback based on the comparison. For example, in FIG. 3M, device 302 displays virtual artist 348 to be providing feedback 358 ("Nicely Done!"). In some embodiments, the customized feedback includes an audio output.

In some embodiments, the drawing application calculates a score based on the comparison between the captured image and the exemplar image, and uses the score to determine the appropriate feedback. A score is, for example, a numerical metric representing a correlation between the lines of the captured image and the exemplar image. In some embodiments, the drawing application determines the appropriate feedback based on the calculated score and on one or more previously calculated scores, in order to detect and encourage progress (e.g., "Nicely Done!" or "Great Progress!"). One of ordinary skill would appreciate that there are many possible techniques that may be used to calculate the score, the particular technique not being of importance, and thus not discussed in more detail here.

F. Virtual Rewards

In some embodiments, the drawing application provides an indication of a virtual reward to a user for completing drawings. In some examples, virtual reward interface 360 is displayed after a user completes drawing one or more subjects. FIG. 3N illustrates exemplary virtual reward interface 360 for providing virtual rewards. Icon 362 indicates that a captured image of the drawing has been saved to the above-described application for viewing a plurality of artwork. Icon 364 indicates that the user has earned points. A user may be prompted to provide input to collect his or her reward. In the depicted example, user 308 initiates tap gesture 366, on touch-sensitive display screen 314 of electronic device 312, to collect his or her virtual reward and unlock a new character. In response, an animation of virtual coins 368 is played. The presentation of virtual rewards encourages the user to continue completing drawing episodes and thus developing his or her drawing skills.

G. Episode Types

Drawing directions as described above can be provided to a user in one of several episode types, each of which varies in the presentation of the drawing directions. Three exemplary episode types are discussed below: "Standard", "Quickdraw", and "Series". These episode types are not intended to be limiting—other episode types can be made available to accommodate different user scenarios. For example, other episode types can be created by combining different aspects of the episodes described below.

(a). Standard Episode

The Standard episode is tailored for a user who desires a high level of engagement with the drawing directions and the featured content of the drawing application, such as the virtual host character and the virtual artist. For example, a younger child may desire detailed drawing directions on how each visual feature of the subject is drawn, and may desire to interact with the virtual host character as much as possible. As another example, a user who has no time constraint for his or her drawing session may desire to access rich content such as artist videos and artist tips to perfect his or her drawing. Designed to offer maximum access to the featured content, the Standard episode presents opportunities for accessing the featured content in a streamlined manner throughout the episode.

One aspect of the Standard episode is that it features a virtual artist prominently throughout the episode. For example, the Standard episode provides entry points for launching videos of the virtual artist at various times throughout the episode. The videos can show the virtual artist to be introducing the episode, drawing the subject, and/or providing contextual drawing tips, thereby simulating a classroom experience with a personal instructor. For example, an introduction video shows the virtual artist welcoming the user to the drawing episode, explaining interesting aspects of computer-animation artistry, providing an overview of the drawing directions to be displayed, or the like. As another example, as each drawing direction is given, the drawing application presents a video or animation depicting the virtual artist performing the drawing direction.

Another aspect of the Standard episode is the detailed presentation of drawing directions. In some embodiments, drawing directions are provided in the form of animation. For example, with reference to FIG. 3B, the drawing application plays an animation of pencil 325 moving on a virtual canvas to draw outline 323 of a subject. This way, the user can consume a drawing direction as if he or she is watching an instructor performing the drawing direction. In some embodiments, the drawing application outputs instructional comments (e.g., attributed to the virtual artist) while playing the animation of the drawing direction to, for example, further explain the action required.

Another aspect of the Standard episode is that it features a virtual host prominently throughout the episode. In some embodiments, the drawing application allows the user to access one or more corresponding videos of the virtual host when each drawing direction is provided. In some embodiments, the drawing application shows the virtual host to be providing at least parts of the drawing directions.

The prominent display of the virtual host and the virtual artist throughout a Standard episode gives the user more opportunities to participate in the interaction dynamics described above. Accordingly, the Standard episode provides a well-guided user experience of the "Tap, Watch, and Draw" mechanism.

(b). Quickdraw Episode

The Quickdraw episode is tailored for a user that desires more autonomy in the drawing process. For example, the user may desire a quick drawing session, with less introduction and quicker progression through the drawing directions than a Standard episode. A Quickdraw episode is designed to provide a quicker drawing experience, while maintaining the core functionalities of the "Tap, Watch, and Draw" mechanism.

One aspect of the Quickdraw episode is that it features fewer appearances of the virtual artist than a Standard episode. In some embodiments, the Quickdraw episode features no virtual artist. In some embodiments, the Quickdraw episode features a brief introduction and/or conclusion video starring the virtual artist, but does not feature the virtual artist when each drawing direction is provided.

Another aspect of the Quickdraw episode is that drawing directions are provided with little or no animation. During a Quickdraw episode, in response to user input to display a drawing direction, the drawing application causes the entirety of the drawing direction to appear. Accordingly, the Quickdraw episode still provides the step-by-step drawing directions, but allows the user to quickly progress through the directions for drawing the subject.

Another aspect of the Quickdraw episode is that it features fewer appearances of the virtual host than a Standard episode. In some embodiments, the Quickdraw episode features no virtual host. In some embodiments, the Quickdraw episode displays the virtual host before drawing directions begin and/or after drawing directions are completed, but not at each drawing direction.

(c). Series Episode—Multiple Subjects

A Series episode allows a user to create artworks that feature multiple subjects. The multiple subjects may depict characters from the same computer-animated movie title or franchise, for example. This way, the drawing application allows the user to create more complex drawings.

In some embodiments, a Series episode comprises a plurality of stand-alone Standard and/or Quickdraw episodes, provided to the user in succession. In some embodiments, a Series episode provides continuous drawing directions for drawing multiple subjects, presented as if it is a single Standard or Quickdraw episode. In either case, after a first set of drawing directions for drawing a first subject is displayed, at least one drawing direction of a second set of drawing directions for drawing a second subject, different from the first subject, is displayed. In some embodiments, at least a portion of the first subject is displayed concurrently with a portion of the second subject. This allows a user to visualize the multiple subjects side-by-side and learn skills for drawing more complex multiple-subject scenes.

Figure 4:
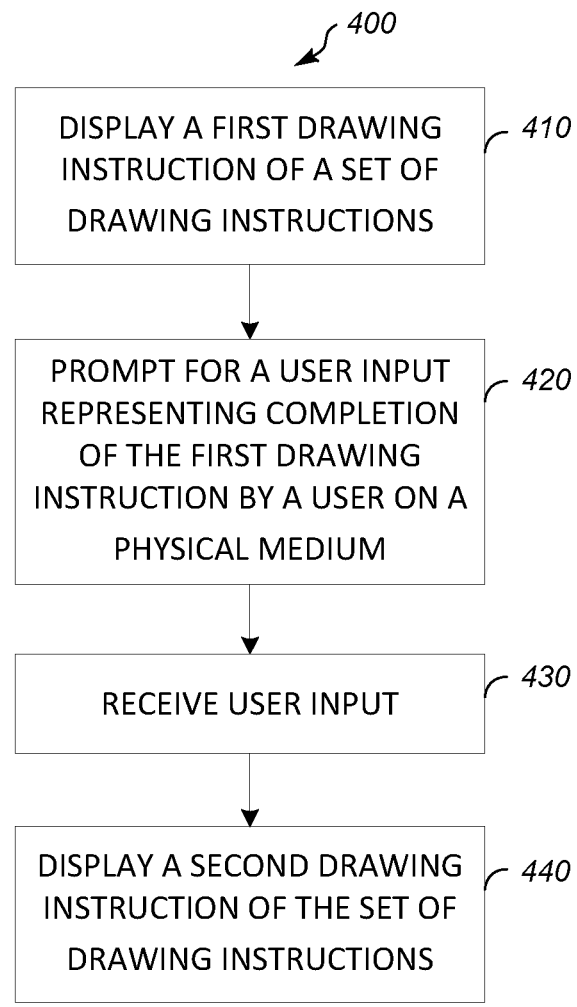
FIG. 4 depicts a block diagram of an exemplary process for the drawing direction interface.

Attention is now directed to FIG. 4, depicting exemplary process 400 which may be carried out by one or more electronic devices to provide the features and user interfaces described with respect to FIGS. 1-3.

At block 410 of process 400, a first drawing direction of a set of drawing directions is displayed. The set of drawing directions provide directions for drawing a subject of a computer-animated movie title on a physical medium, such as the directions described with reference to FIGS. 2D-2G. The first drawing direction includes a representation of a virtual host, wherein the virtual host is a computer-animated character from a computer-animated movie title, such as the virtual host described with reference to FIGS. 2D-2G and FIGS. 3F-3H. The virtual host provides at least a part of the directions for drawing the subject.

At block 420, user input representing completion of the first drawing direction by a user on the physical medium is prompted. The prompt may be a GUI prompt element displayed as described with reference to FIG. 2E. At block 430, user input representing completion of the first drawing direction by a user on the physical medium is received. In some examples, the user input is a user touch at an electronic device. In some examples, the user input is an audio user input.

At block 440, a second drawing direction of the set of drawing directions is displayed. The second drawing direction of the set of drawing directions is displayed in response to receiving the user input representing completion of the first drawing direction, and may be displayed as described with reference to FIG. 2G.

Figure 5:
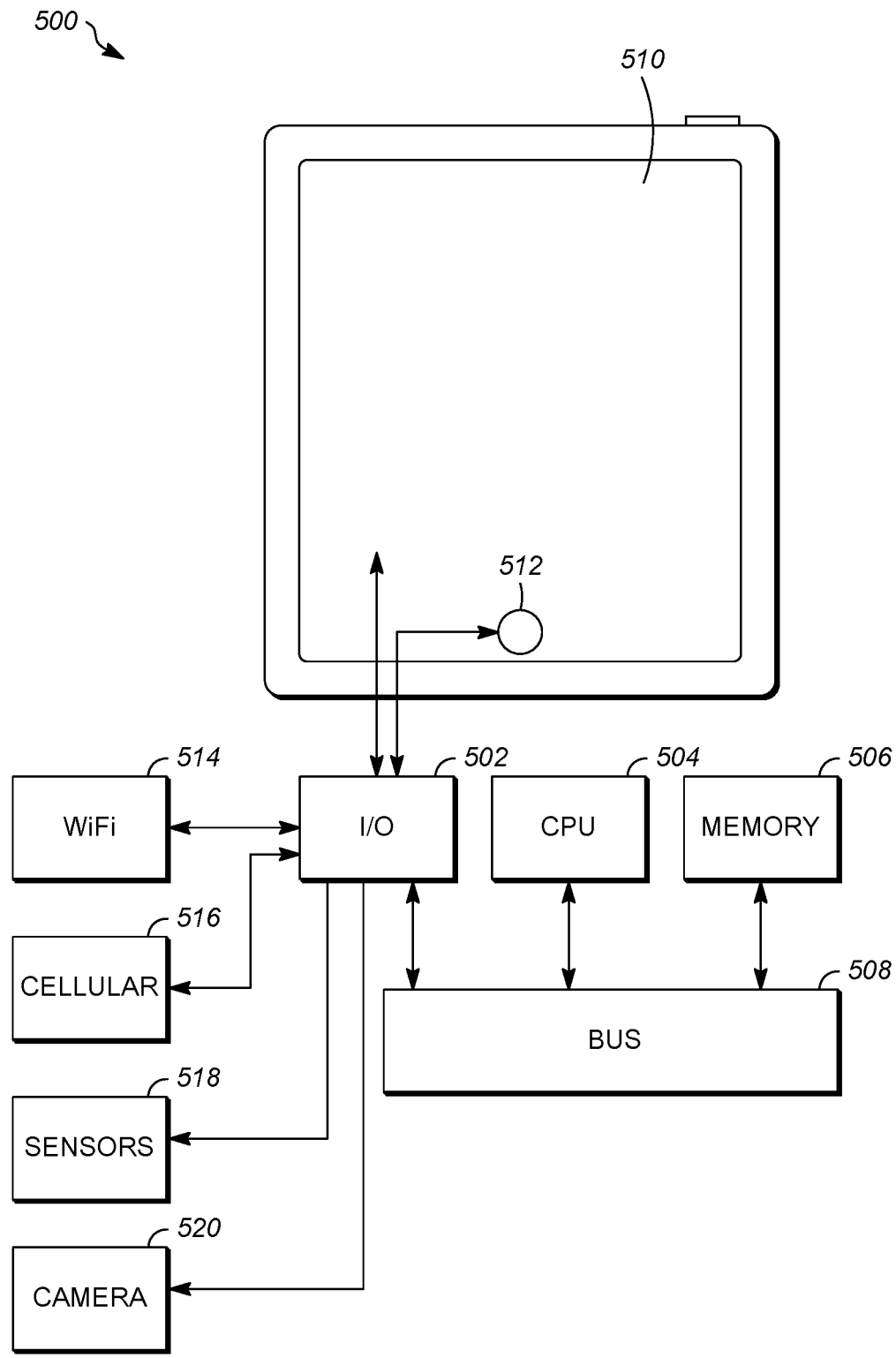
FIG. 5 depicts an exemplary computer.

Attention is now directed to FIG. 5, which illustrates exemplary computer 500 which is used to provide the above-described techniques, including for example the executing of process 400 (FIG. 4), in accordance with some embodiments. Computer 500 implements the features of the digital user interface that provides drawing direction as described above with respect to FIGS. 1-3 in some examples.

In some embodiments, computer 500 is arranged as a cellular phone and/or a tablet computer. In some embodiments, computer 500 is arranged as a desktop computer and/or a laptop computer. Exemplary computer 500 comprises a motherboard with bus 508 that connects input/output (I/O) section 502, one or more microprocessors 504, and a memory section 506 together. I/O section 502 is connected to display 510 and input device 512. In the illustrated example, display 510 and input device 512 are coupled to form a touch-sensitive display screen ("touchscreen"). In some examples, display 510 is separate but coupled to and input device 512 in the form of one or more buttons, a physical keyboard, a mouse, or the like. I/O section 502 is also connected to one or more of Wi-Fi unit 514, cellular antenna 516, sensors 518, and camera 520. Sensors 518 include, for example, a GPS sensor, a light sensor, a gyroscope, an accelerometer, or a combination thereof.

Memory 506 is a computer-readable medium that stores (e.g., tangibly embodies) one or more computer programs for performing the above-described process. In some examples, memory section 506 is a computer-readable medium that stores (e.g., tangibly embodies) one or more computer executable instructions and/or data for carrying out the techniques described above with reference to FIGS. 1-3, as well as process 400 (FIG. 4). In some examples, the computer-readable medium of memory 506 is a non-transitory computer-readable medium. At least some values based on the results of the above-described process can be saved into memory, such as memory 506, for subsequent use. In some examples, the computer program is downloaded into memory 506 as a software "app" or application. In some examples, microprocessor(s) 504 includes an application-specific chipset for carrying out the above-described techniques.

Figure 6:
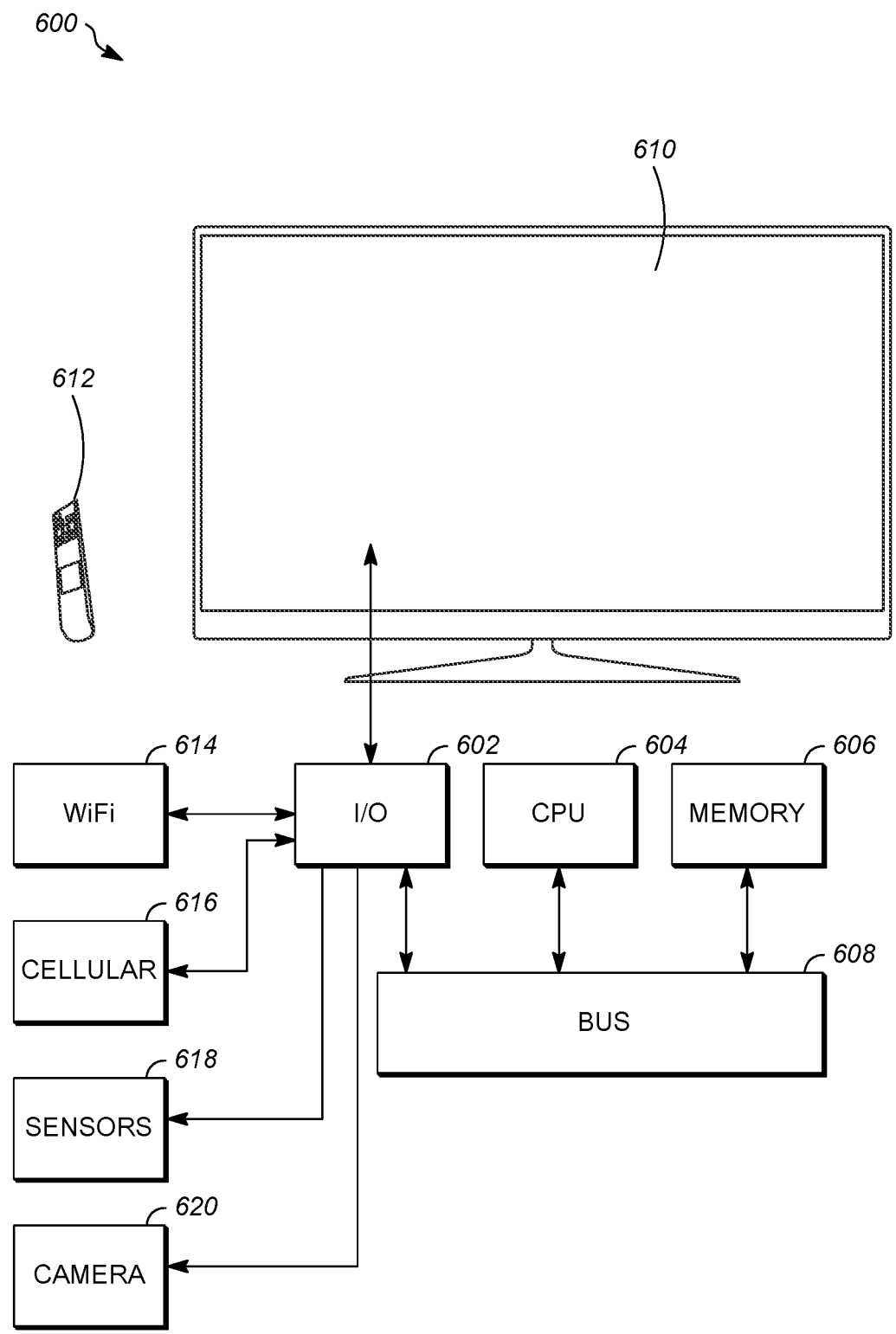
FIG. 6 depicts an exemplary television system.

Attention is now directed to FIG. 6, which illustrates exemplary television system 600 which is used to provide the above-described techniques, including for example the executing of process 400 (FIG. 4), in accordance with some embodiments. Television system 600 implements the features of the digital user interface that provides drawing direction as described above with respect to FIGS. 1-3 in some examples.

Exemplary television system 600 comprises a motherboard with bus 608 that connects input/output (I/O) section 602, one or more microprocessors 604, and a memory section 606 together. I/O section 602 is connected to display 610. I/O section 602 is also connected to one or more of Wi-Fi unit 614, cellular antenna 616, sensors 618, and camera 620. Sensors 618 include, for example, a GPS sensor, a light sensor, a gyroscope, an accelerometer, or a combination thereof.

Exemplary television system 600 also comprises remote control 612. In some examples, remote control 612 wirelessly communicates with one or more of the other components of television system 600. In some examples, communication from remote control 612 is received via one of sensors 618. In some examples, remote control 612 comprises one or more of a button, touch-sensitive surface, or the like.

Memory 606 is a computer-readable medium that stores (e.g., tangibly embodies) one or more computer programs for performing the above-described process. In some examples, memory section 606 is a computer-readable medium that stores (e.g., tangibly embodies) one or more computer executable instructions and/or data for carrying out the techniques described above with reference to FIGS.

1-3, as well as process 400 (FIG. 4). In some examples, the computer-readable medium of memory 606 is a non-transitory computer-readable medium. At least some values based on the results of the above-described process can be saved into memory, such as memory 606, for subsequent use. In some examples, the computer program is downloaded into memory 606 as a software "app" or application. In some examples, microprocessor(s) 604 includes an application-specific chipset for carrying out the above-described techniques.

Aspects of the embodiments disclosed above can be combined in other combinations to form additional embodiments. Accordingly, all such modifications are intended to be included within the scope of this technology.

What is claimed is:

1. A computer-implemented method for providing drawing directions, the method comprising:
    displaying, on a display screen of an electronic device, a first drawing direction of a set of drawing directions,
    wherein the set of drawing directions provide directions for drawing a subject of a computer-animated movie title on a physical medium,
    wherein the first drawing direction includes a representation of a virtual host to aid the drawing directions,
    wherein the virtual host is a computer-animated character from a computer-animated movie title to aid the drawing directions, and wherein the virtual host provides at least a part of the directions for drawing the subject;
    prompting for a user input representing completion of the first drawing direction by a user on the physical medium;
    displaying, on the display screen, visual cues indicating that the virtual host draws along with the user to create a virtual drawing of the subject;
    in response to receiving the user input representing completion of the first drawing direction, displaying, on the display screen, a second drawing direction of the set of drawing directions; and
    displaying a graphical element indicating a progress of the user within the set of drawing directions, wherein the graphical element includes a selectable element that enables the user to go back or skip ahead within the set of drawing directions.

2. The method of claim 1, further comprising:
    displaying a video featuring a computer-animation artist, the video comprising direction by the artist on how to draw the subject.

3. The method of claim 2, further comprising:
    providing an output representing an exchange between the computer-animation artist and the virtual host.

4. The method of claim 1, further comprising:
    receiving a user input representing a request for an artist tip;
    displaying the artist tip, wherein the artist tip features advice on how to draw the subject.

5. The method of claim 1, further comprising:
    receiving a user input representing a request to view the virtual host's virtual drawing of the subject; in response to receiving the user input representing the request to view the virtual host's virtual drawing of the subject, displaying the virtual host's virtual drawing of the subject.

6. The method of claim 5, wherein the virtual host's virtual drawing depicts a drawing mistake.

7. The method of claim 1, further comprising:
    providing an output representing an utterance directed to the user from the virtual host, wherein the utterance is based on a plot of a computer-animated movie title.

8. The method of claim 1, wherein the subject comprises a visual feature in a first style, the method further comprising:
    displaying, on the display screen, one or more alternative styles for the visual feature;
    receiving a user input representing selection of an alternative style of the one or more alternative styles; and
    in response to receiving the user input representing selection of the alternative style, displaying the subject with the visual feature in the selected alternative style.

9. The method of claim 1,
    wherein displaying the first drawing direction of the set of drawing directions comprises playing, on the display screen, an animation of a first portion of the subject being drawn, and
    wherein displaying the second drawing direction of the set of drawing directions comprises playing, on the display screen, an animation of a second portion of the subject being drawn while concurrently displaying the first portion of the subject.

10. The method of claim 1,
    wherein displaying the first drawing direction of the set of drawing directions comprises displaying, on the display screen, a first portion of the subject, and
    wherein displaying the second drawing direction of the set of drawing directions comprises displaying, on the display screen, a second portion of the subject while concurrently displaying the first portion of the subject.

11. The method of claim 1, wherein the set of drawing directions is a first set of drawing directions, and wherein the subject is a first subject, the method further comprising:
    displaying, on the display screen, at least one drawing direction of a second set of drawing directions for drawing a second subject different from the first subject.

12. The method of claim 1, further comprising:
    displaying, on the display screen, a plurality of computer-animated movie titles;
    receiving a first user input representing selection of a computer-animated movie title of the plurality of computer-animated movie titles, wherein the selected computer-animated movie title features the subject;
    in response to receiving the first user input representing the selection of the computer-animated movie title, displaying, on the display screen, a plurality of episodes featuring subjects of the selected computer-animated movie title;
    receiving a second user input representing selection of an episode of the plurality of episodes, wherein the selected episode features the subject; and
    displaying, on the display screen, the first drawing direction.

13. The method of claim 12,
    wherein receiving the first user input comprises receiving a first user utterance representing selection of the computer-animated movie title, and
    wherein receiving the second user input comprises receiving a second user utterance representing selection of the episode.

14. The method of claim 1, wherein the set of drawing directions is a first set of drawing directions, and wherein the subject is a first subject, the method further comprising:
    receiving a user input representing selection of a second set of drawing directions, wherein the second set of drawing directions comprises drawing directions for drawing a second subject; and in response to receiving the user input representing selection of the second set of drawing directions, concurrently displaying, on the display screen, the first subject and a first drawing direction of the second set of drawing directions.

15. The method of claim 1, further comprising:

capturing, using a camera, an image of artwork on the physical medium, wherein the artwork was drawn on the physical medium in accordance with the first drawing direction and the second drawing direction;

storing the captured image; and associating the captured image with an account associated with the user.

16. The method of claim 15, further comprising:

comparing the captured image to an exemplar image of the subject;

displaying an indication of feedback based on the comparison.

17. The method of claim 15, further comprising:

displaying a composite image, wherein the composite image is a composite of the captured image and an exemplar image of the subject.

18. The method of claim 15, wherein the user is a first user, the method further comprising:

displaying, on the display screen, a graphical user interface for viewing a plurality of artwork created by a group of users, wherein the group of users includes the first user and a second user different from the first user, and wherein the plurality of artwork comprises the captured image, and a second image of an artwork created by the second user.

19. The method of claim 1, wherein the electronic device is a first electronic device, the method further comprising:

displaying, on a display screen of a second electronic device, content relating to drawing the subject, wherein the content displayed on the display screen of the second electronic device is different from content concurrently displayed on the display screen of the first electronic device, and in response to receiving an input on the second electronic device, updating the content displayed on the display screen of the first electronic device.

20. A non-transitory computer-readable storage medium comprising computer-executable instructions for providing drawing directions when executed by one or more processors of an electronic device with a display screen, the computer-executable instructions comprising instructions for:

displaying, on a display screen of an electronic device, a first drawing direction of a set of drawing directions, wherein the set of drawing directions provide directions for drawing a subject of a computer-animated movie title on a physical medium, wherein the first drawing direction includes a representation of a virtual host to aid the drawing directions, wherein the virtual host is a computer-animated character from a computer-animated movie title to aid the drawing directions, and wherein the virtual host provides at least a part of the directions for drawing the subject;

prompting for a user input representing completion of the first drawing direction by a user on the physical medium;

displaying, on the display screen, visual cues indicating that the virtual host draws along with the user to create a virtual drawing of the subject;

in response to receiving the user input representing completion of the first drawing direction, displaying, on the display screen, a second drawing direction of the set of drawing directions; and displaying a graphical element indicating a progress of the user within the set of drawing directions, wherein the graphical element includes a selectable element that enables the user to go back or skip ahead within the set of drawing directions.

21. The computer-readable storage medium of claim 20, further comprising instructions for:

displaying a video featuring a computer-animation artist, the video comprising direction by the artist on how to draw the subject.

22. The computer-readable storage medium of claim 21, further comprising instructions for:

providing an output representing an exchange between the computer-animation artist and the virtual host.

23. The computer-readable storage medium of claim 20, further comprising instructions for:

receiving a user input representing a request for an artist tip;

displaying the artist tip, wherein the artist tip features advice on how to draw the subject.

24. The computer-readable storage medium of claim 20, further comprising instructions for: receiving a user input representing a request to view the virtual host's virtual drawing of the subject; in response to receiving the user input representing the request to view the virtual host's virtual drawing of the subject, displaying the virtual host's virtual drawing of the subject.

25. The computer-readable storage medium of claim 24, wherein the virtual host's virtual drawing depicts a drawing mistake.

26. The computer-readable storage medium of claim 20, further comprising instructions for:

providing an output representing an utterance directed to the user from the virtual host, wherein the utterance is based on a plot of a computer-animated movie title.

27. The computer-readable storage medium of claim 20, wherein the subject comprises a visual feature in a first style, the computer-executable instructions further comprising instructions for:

displaying, on the display screen, one or more alternative styles for the visual feature;

receiving a user input representing selection of an alternative style of the one or more alternative styles; and in response to receiving the user input representing selection of the alternative style, displaying the subject with the visual feature in the selected alternative style.

28. The computer-readable storage medium of claim 20, wherein displaying the first drawing direction of the set of drawing directions comprises playing, on the display screen, an animation of a first portion of the subject being drawn, and wherein displaying the second drawing direction of the set of drawing directions comprises playing, on the display screen, an animation of a second portion of the subject being drawn while concurrently displaying the first portion of the subject.

29. The computer-readable storage medium of claim 20, wherein displaying the first drawing direction of the set of drawing directions comprises displaying, on the display screen, a first portion of the subject, and wherein displaying the second drawing direction of the set of drawing directions comprises displaying, on the display screen, a second portion of the subject while concurrently displaying the first portion of the subject.

30. The computer-readable storage medium of claim 20, wherein the set of drawing directions is a first set of drawing directions, and wherein the subject is a first subject, the computer-executable instructions further comprising instructions for:
displaying, on the display screen, at least one drawing direction of a second set of drawing directions for drawing a second subject different from the first subject.

31. The computer-readable storage medium of claim 20, further comprising instructions for:
displaying, on the display screen, a plurality of computer-animated movie titles;
receiving a first user input representing selection of a computer-animated movie title of the plurality of computer-animated movie titles, wherein the selected computer-animated movie title features the subject;
in response to receiving the first user input representing the selection of the computer-animated movie title, displaying, on the display screen, a plurality of episodes featuring subjects of the selected computer-animated movie title;
receiving a second user input representing selection of an episode of the plurality of episodes, wherein the selected episode features the subject; and
displaying, on the display screen, the first drawing direction.

32. The computer-readable storage medium of claim 31, wherein receiving the first user input comprises receiving a first user utterance representing selection of the computer-animated movie title, and
wherein receiving the second user input comprises receiving a second user utterance representing selection of the episode.

33. The computer-readable storage medium of claim 20, wherein the set of drawing directions is a first set of drawing directions, and wherein the subject is a first subject, the computer-executable instructions further comprising instructions for:
receiving a user input representing selection of a second set of drawing directions,
wherein the second set of drawing directions comprises drawing directions for drawing a second subject; and
in response to receiving the user input representing selection of the second set of drawing directions, concurrently displaying, on the display screen, the first subject and a first drawing direction of the second set of drawing directions.

34. The computer-readable storage medium of claim 20, further comprising instructions for:
capturing, using a camera, an image of artwork on the physical medium, wherein the artwork was drawn on the physical medium in accordance with the first drawing direction and the second drawing direction;
storing the captured image; and
associating the captured image with an account associated with the user.

35. The computer-readable storage medium of claim 34, further comprising instructions for:
comparing the captured image to an exemplar image of the subject;
displaying an indication of feedback based on the comparison.

36. The computer-readable storage medium of claim 34, further comprising instructions for:
displaying a composite image, wherein the composite image is a composite of the captured image and an exemplar image of the subject.

37. The computer-readable storage medium of claim 34, wherein the user is a first user, the computer-executable instructions further comprising instructions for:
displaying, on the display screen, a graphical user interface for viewing a plurality of artwork created by a group of users,
wherein the group of users includes the first user and a second user different from the first user, and
wherein the plurality of artwork comprises the captured image, and a second image of an artwork created by the second user.

38. The computer-readable storage medium of claim 20, wherein the electronic device is a first electronic device, the computer-executable instructions further comprising instructions for:
causing display of, on a display screen of a second electronic device, content relating to drawing the subject, wherein the content displayed on the display screen of the second electronic device is different from content concurrently displayed on the display screen of the first electronic device, and
in response to receiving an input on the second electronic device, updating the content displayed on the display screen of the first electronic device.

39. An electronic device, comprising:
a display screen; one or more processors; memory; and
one or more programs, wherein the one or more programs are stored in the memory and configured to be executed by the one or more processors, the one or more programs including instructions for:
displaying, on a display screen of an electronic device, a first drawing direction of a set of drawing directions,
wherein the set of drawing directions provide directions for drawing a subject of a computer-animated movie title on a physical medium,
wherein the first drawing direction includes a representation of a virtual host to aid the drawing directions,
wherein the virtual host is a computer-animated character from a computer-animated movie title to aid the drawing directions, and wherein the virtual host provides at least a part of the directions for drawing the subject;
prompting for a user input representing completion of the first drawing direction by a user on the physical medium;
displaying, on the display screen, visual cues indicating that the virtual host draws along with the user to create a virtual drawing of the subject;
in response to receiving the user input representing completion of the first drawing direction, displaying, on the display screen, a second drawing direction of the set of drawing directions; and
displaying a graphical element indicating a progress of the user within the set of drawing directions, wherein the graphical element includes a selectable element that enables the user to go back or skip ahead within the set of drawing directions.

40. The electronic device of claim 39, the instructions further comprising instructions for:
displaying a video featuring a computer-animation artist, the video comprising direction by the artist on how to draw the subject.

41. The electronic device of claim 40, the instructions further comprising instructions for:
   providing an output representing an exchange between the computer-animation artist and the virtual host.

42. The electronic device of claim 39, the instructions further comprising instructions for:
   receiving a user input representing a request for an artist tip;
   displaying the artist tip, wherein the artist tip features advice on how to draw the subject.

43. The electronic device of claim 39, the instructions further comprising instructions for: receiving a user input representing a request to view the virtual host's virtual drawing of the subject; in response to receiving the user input representing the request to view the virtual host's virtual drawing of the subject, displaying the virtual host's virtual drawing of the subject.

44. The electronic device of claim 43, wherein the virtual host's virtual drawing depicts a drawing mistake.

45. The electronic device of claim 39, the instructions further comprising instructions for:
   providing an output representing an utterance directed to the user from the virtual host, wherein the utterance is based on a plot of a computer-animated movie title.

46. The electronic device of claim 39, wherein the subject comprises a visual feature in a first style, and wherein the instructions further comprise instructions for:
   displaying, on the display screen, one or more alternative styles for the visual feature;
   receiving a user input representing selection of an alternative style of the one or more alternative styles; and
   in response to receiving the user input representing selection of the alternative style, displaying the subject with the visual feature in the selected alternative style.

47. The electronic device of claim 39,
   wherein displaying the first drawing direction of the set of drawing directions comprises playing, on the display screen, an animation of a first portion of the subject being drawn, and
   wherein displaying the second drawing direction of the set of drawing directions comprises playing, on the display screen, an animation of a second portion of the subject being drawn while concurrently displaying the first portion of the subject.

48. The electronic device of claim 39,
   wherein displaying the first drawing direction of the set of drawing directions comprises displaying, on the display screen, a first portion of the subject, and
   wherein displaying the second drawing direction of the set of drawing directions comprises displaying, on the display screen, a second portion of the subject while concurrently displaying the first portion of the subject.

49. The electronic device of claim 39, wherein the set of drawing directions is a first set of drawing directions, and wherein the subject is a first subject, and wherein the instructions further comprise instructions for:
   displaying, on the display screen, at least one drawing direction of a second set of drawing directions for drawing a second subject different from the first subject.

50. The electronic device of claim 39, the instructions further comprising instructions for:
   displaying, on the display screen, a plurality of computer-animated movie titles;
   receiving a first user input representing selection of a computer-animated movie title of the plurality of computer-animated movie titles, wherein the selected computer-animated movie title features the subject;
   in response to receiving the first user input representing the selection of the computer-animated movie title, displaying, on the display screen, a plurality of episodes featuring subjects of the selected computer-animated movie title;
   receiving a second user input representing selection of an episode of the plurality of episodes, wherein the selected episode features the subject; and
   displaying, on the display screen, the first drawing direction.

51. The electronic device of claim 50,
   wherein receiving the first user input comprises receiving a first user utterance representing selection of the computer-animated movie title, and
   wherein receiving the second user input comprises receiving a second user utterance representing selection of the episode.

52. The electronic device of claim 39, wherein the set of drawing directions is a first set of drawing directions, and wherein the subject is a first subject, and wherein the instructions further comprise instructions for:
   receiving a user input representing selection of a second set of drawing directions,
      wherein the second set of drawing directions comprises drawing directions for drawing a second subject; and
   in response to receiving the user input representing selection of the second set of drawing directions, concurrently displaying, on the display screen, the first subject and a first drawing direction of the second set of drawing directions.

53. The electronic device of claim 39, the instructions further comprising instructions for:
   capturing, using a camera, an image of artwork on the physical medium, wherein the artwork was drawn on the physical medium in accordance with the first drawing direction and the second drawing direction;
   storing the captured image; and
   associating the captured image with an account associated with the user.

54. The electronic device of claim 53, the instructions further comprising instructions for:
   comparing the captured image to an exemplar image of the subject;
   displaying an indication of feedback based on the comparison.

55. The electronic device of claim 53, the instructions further comprising instructions for:
   displaying a composite image, wherein the composite image is a composite of the captured image and an exemplar image of the subject.

56. The electronic device of claim 53, wherein the user is a first user, and wherein the instructions further comprise instructions for:
   displaying, on the display screen, a graphical user interface for viewing a plurality of artwork created by a group of users,
      wherein the group of users includes the first user and a second user different from the first user, and
      wherein the plurality of artwork comprises the captured image, and a second image of an artwork created by the second user.

57. The electronic device of claim 39, wherein the electronic device is a first electronic device, and wherein the instructions further comprise instructions for:

causing display of, on a display screen of a second electronic device, content relating to drawing the subject, wherein the content displayed on the display screen of the second electronic device is different from content concurrently displayed on the display screen of the first electronic device, and in response to receiving an input on the second electronic device, updating the content displayed on the display screen of the first electronic device.

\* \* \* \* \*